United States Patent
Chliwnyj et al.

(10) Patent No.: US 6,839,197 B2
(45) Date of Patent: Jan. 4, 2005

(54) APPARATUS AND METHOD TO CALIBRATE ONE OR MORE TRANSDUCERS IN A NOISY ENVIRONMENT

(75) Inventors: Alex Chliwnyj, Tucson, AZ (US); David L. Swanson, Tucson, AZ (US); Steven C. Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/185,125

(22) Filed: Jun. 27, 2002

(65) Prior Publication Data

US 2004/0001274 A1 Jan. 1, 2004

(51) Int. Cl.[7] .............................................. G11B 5/584
(52) U.S. Cl. ................................................. 360/77.12
(58) Field of Search ............................. 360/77.12, 75, 360/78.02

(56) References Cited

U.S. PATENT DOCUMENTS

| | | | | |
|---|---|---|---|---|
| 4,677,505 A | * | 6/1987 | Nukada et al. ............. | 360/77.12 |
| 5,294,791 A | * | 3/1994 | Pahr ........................ | 360/77.12 |
| 5,379,165 A | | 1/1995 | Pahr ........................ | 360/78.02 |
| 5,457,586 A | * | 10/1995 | Solhjell .................... | 360/77.12 |
| 5,574,602 A | * | 11/1996 | Baca et al. ............... | 360/77.12 |
| 5,583,784 A | | 12/1996 | Kapust et al. .............. | 364/484 |
| 5,617,269 A | * | 4/1997 | Gordenker et al. ........ | 360/77.12 |
| 5,844,814 A | * | 12/1998 | Chliwnyj et al. .......... | 360/77.12 |
| 5,901,008 A | * | 5/1999 | Nayak et al. ............. | 360/78.02 |
| 5,923,494 A | * | 7/1999 | Arisaka et al. ............ | 360/75 |
| 5,946,159 A | * | 8/1999 | Chliwnyj et al. .......... | 360/77.12 |
| 5,956,199 A | * | 9/1999 | Husky et al. .............. | 360/75 |
| 5,999,359 A | * | 12/1999 | Fasen ....................... | 360/77.12 |
| 6,462,899 B1 | * | 10/2002 | Chliwnyj et al. .......... | 360/77.12 |
| 6,525,898 B1 | * | 2/2003 | Chliwnyj et al. .......... | 360/77.12 |
| 6,661,600 B1 | * | 12/2003 | Chliwnyj et al. .......... | 360/77.12 |
| 6,674,603 B2 | * | 1/2004 | Basham et al. ........... | 360/77.12 |

* cited by examiner

*Primary Examiner*—Andrew L. Sniezek
*Assistant Examiner*—James L Habermehl
(74) *Attorney, Agent, or Firm*—Dale F. Regelman

(57) ABSTRACT

A method to calibrate a transducer, whereby the transducer provides a first signal, and whereby a reference provides a reference signal. The first signal is sampled at a sampling rate comprising a reference frequency, and a digital measured first signal waveform is formed. The reference signal is sampled at the sampling rate, and a digital measured reference signal waveform is formed. The real and imaginary components of the measured first signal waveform are determined at (P) harmonics of the reference frequency. A filtered first signal waveform is formed using those real and imaginary components. The real and imaginary components of the measured reference signal waveform are determined at (P) harmonics of the reference frequency. A filtered reference signal waveform is formed using those real and imaginary components. A transfer function is formed using the filtered first signal waveform and the filtered reference signal waveform. A calibration curve is formed using that transfer function.

93 Claims, 16 Drawing Sheets

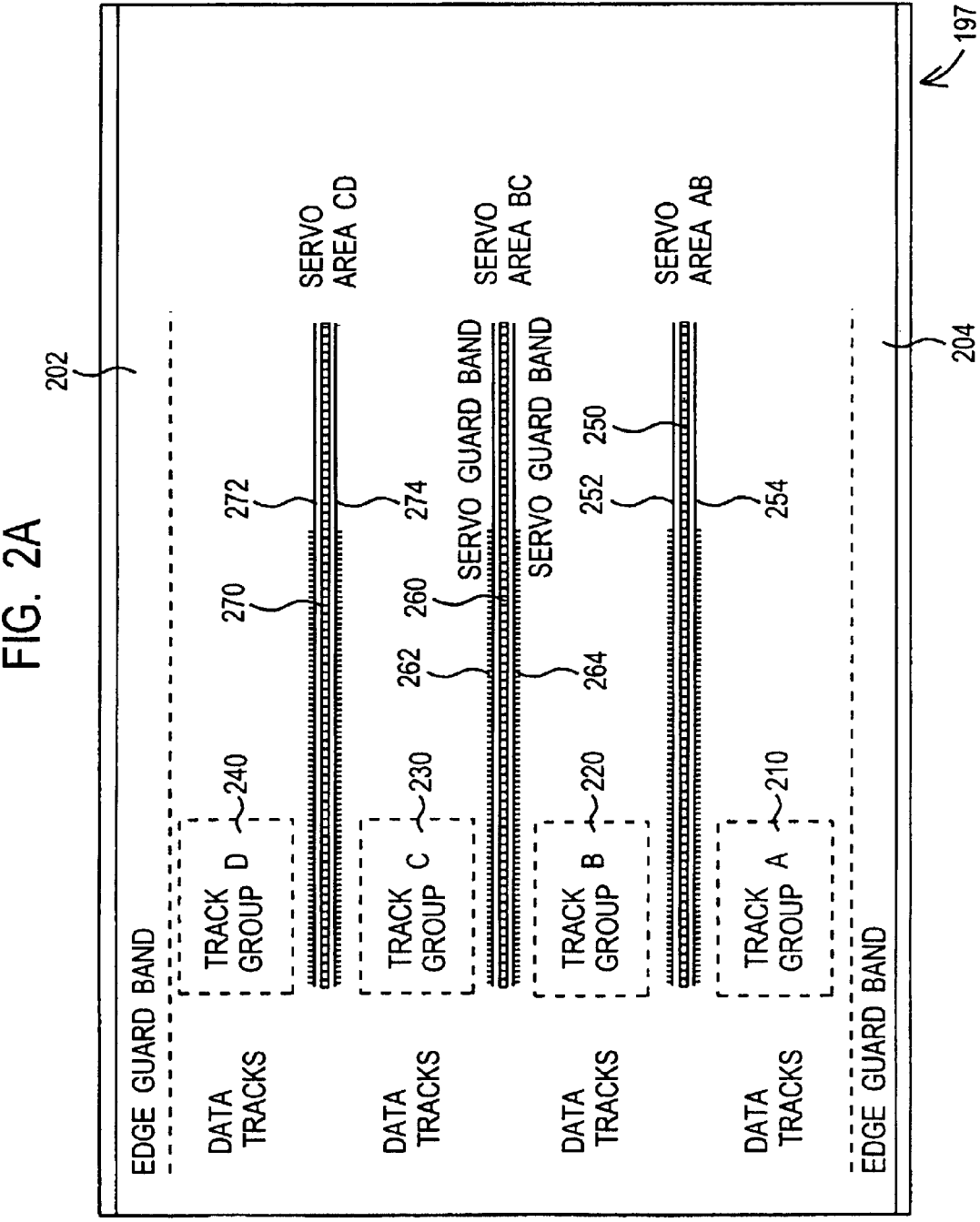

FIG. 2B

| HEAD TRACK NO. | HEAD L | MODULE R | | |
|---|---|---|---|---|
| 1 | WR | RD | | |
| 2 | RD | WR | | |
| 3 | WR | RD | | |
| 4 | RD | WR | | |
| 5 | WR | RD | | |
| 6 | RD | WR | | |
| 7 | WR | RD | | |
| 8 | RD | WR | ~272 | |
| SERVO | LS1 | RS1 | ~274 | 275 |
| SERVO | LS2 | RS2 | ~278 | |
| 9 | WR | RD | ~276 | |
| 10 | RD | WR | | |
| 11 | WR | RD | | |
| 12 | RD | WR | | |
| 13 | WR | RD | | |
| 14 | RD | WR | | |
| 15 | WR | RD | | |
| 16 | RD | WR | ~262 | |
| SERVO | LS3 | RS3 | ~264 | 265 |
| SERVO | LS4 | RS4 | ~268 | |
| 17 | WR | RD | ~266 | |
| 18 | RD | WR | | |
| 19 | WR | RD | | |
| 20 | RD | WR | | |
| 21 | WR | RD | | |
| 22 | RD | WR | | |
| 23 | WR | RD | | |
| 24 | RD | WR | ~252 | |
| SERVO | LS5 | RS5 | ~254 | 255 |
| SERVO | LS6 | RS6 | ~258 | |
| 25 | WR | RD | ~256 | |
| 26 | RD | WR | | |
| 27 | WR | RD | | |
| 28 | RD | WR | | |
| 29 | WR | RD | | |
| 30 | RD | WR | | |
| 31 | WR | RD | | |
| 32 | RD | WR | | |

APPARATUS AND METHOD TO CALIBRATE ONE OR MORE TRANSDUCERS IN A NOISY ENVIRONMENT

FIELD OF THE INVENTION

This invention relates to an apparatus and method to calibrate one or more transducers in a "noisy" environment. In certain embodiments, this invention relates to servo track following a moving magnetic tape having one or more servo edges of dissimilar recorded servo signals, and, more particularly, to calibrating one or more servo sensors.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Magnetic tape data storage typically provides one or more prerecorded servo tracks to allow precise positioning of a tape head with respect to those prerecorded servo tracks. Servo sensors disposed on the tape head are used to track the recorded servo tracks. The tape head comprises one or more read/write elements precisely positioned with respect to those servo sensors. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

In certain embodiments, the tape head includes a plurality of servo sensors for each servo edge, with the result that the tape head may be stepped between those servo sensors, each positioning the read/write elements at different interleaved groups of data tracks. Typically, for a given servo pattern of a set of two servo edges, the outer servo signals are recorded first, and the center servo signal is recorded last, to provide the servo edges. The nominal separation distance between the servo edges of each set of servo edges is a certain distance, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, i.e. be "squeezed" together, such that writing on one track with a write element that is subject to track misregistration (TMR) may cause a data error on the immediately adjacent data track.

The tape path of the above IBM 3590 is a guided tape path. In such a guided tape path embodiment, the magnetic tape can be moved in a first direction and an opposing second direction along a first axis, i.e. along the longitudinal axis of the tape. Movement of that tape along a second axis orthogonal to the first axis, i.e. the lateral axis of the tape, is minimized. Limiting the lateral movement of the magnetic tape results in generating minimal guiding noise, and therefore, the step from a first ratio of servo signals to a second ratio is readily discernible.

Another approach, however, is required for open channel guiding in which the magnetic tape can move laterally a distance which is substantially greater than the separation between index positions, thereby introducing substantial noise into the calibration process. The guiding signal to noise ratio thus becomes negative, with the guiding noise being far larger than the step from one ratio to another, making it difficult to gather data points with a monotonically increasing or decreasing slope to conduct a calibration of the servo ratios.

SUMMARY OF THE INVENTION

Applicants' invention includes an apparatus and method to calibrate one or more servo sensors with respect to one or more index positions laterally offset from one or more servo edges recorded on a magnetic tape in an environment where that magnetic tape is subject to movement along two different axes. Applicants' method utilizes a magnetic tape having at least one set of parallel linear servo edges. In certain embodiments, each servo edge comprises an interface between two dissimilar recorded servo signals, and each set of servo edges comprises one of the servo edges on each of opposite lateral sides of a middle recorded servo signal. Applicants' method calibrates one or more servo sensors with respect to one or more servo index positions laterally offset from the one or more linear servo edges, where those one or more index positions are determined by the ratios of the detected dissimilar recorded servo signals.

The servo system comprises at least one servo sensor disposed on a tape head. That tape head can be moved in a first direction and an opposing second direction along a first axis. The magnetic tape is caused to move along a tape path primarily in a third direction and an opposing fourth direction along a second axis, where the first axis and the second axis are substantially orthogonal. By substantially orthogonal, Applicants mean the angle formed between the first axis and the second axis is about 90 degrees, plus or minus about 10 degrees. As noted above, in non-guided embodiments the tape is also subject to movement along the first axis as it is caused to move unidirectionally, or optionally bidirectionally, along the second axis.

As the tape moves along both the first and second axes, the tape head is movable along the first axis such that the one or more servo sensors detect the recorded servo signals. The servo system also comprises a servo detector in communication with each of the one or more servo sensors. Each of those servo sensors provides an analog signal to the servo detector which provides an analog servo signal comprising a ratio of the detected recorded frequencies. Applicants' apparatus further includes an independent position sensor to measure the position of the tape head with respect to the tape path. That independent position sensor provides an analog IPS signal comprising that measurement.

Applicants' apparatus further includes a servo loop for positioning the tape head laterally with respect to the magnetic tape, and servo logic in communication with the servo detector, the independent position sensor, and the servo loop. That servo logic track follows the sensed servo signals at specific servo signal ratios, sometimes called position error signals, corresponding to specific lateral displacements from the linear servo edges, i.e. specific index positions.

Applicants' method operates the servo loop to modulate the lateral position of the tape head and, thereby, the servo sensor, using a sinusoidal positioning signal. In certain embodiments, Applicants' method operates the servo loop to laterally position the servo sensor to measure the servo signals at continually altered digital set points of the ratios of the sensed servo signals. These set points are altered at the sample rate of the servo loop, and are altered to inject the sinusoidal positioning signal, whereby the servo loop track follows the linear servo edges with the servo loop at the continually altered digital set points.

The sinusoidal positioning signal comprises a reference frequency that is precisely known. In certain embodiments, that reference frequency is selected such that the reference frequency, and major harmonics thereof, each differs from intrinsic operational frequencies of the track following servo system and/or tape system.

Applicants' method digitally forms a sampled IPS signal waveform by sampling the provided IPS signal at the predetermined sampling rate. Applicants' method then determines the real and imaginary components of that measured IPS signal waveform at the reference frequency and, optionally, at (P) harmonics of that reference frequency. Applicants' method then forms a filtered IPS signal waveform using those real and imaginary components.

Similarly, Applicants' method digitally forms a sampled servo signal waveform by sampling the provided servo signal at the predetermined sampling rate. Applicants' method then determines the real and imaginary components of that sampled servo signal waveform at the reference frequency and, optionally, at (P) harmonics of that reference frequency. Applicants' method then forms a filtered servo sensor ratio waveform using those real and imaginary components.

Applicants' method then correlates the filtered IPS signal waveform with the filtered servo sensor ratio waveform and determines therefrom a plurality of measured datapoints comprising independent position sensor lateral positions corresponding to detected ratios of the recorded servo frequencies. Applicants' method then calculates a transfer function using these measured datapoints and an (n)th order curve fitting algorithm. That transfer function is thereafter used to calculate expected position error signals for the servo loop at one or more laterally offset servo index positions with respect to the sensed servo edge(s).

BRIEF DESCRIPTION OF THE DRAWINGS

The invention will be better understood from a reading of the following detailed description taken in conjunction with the drawings in which like reference designators are used to designate like elements, and in which:

FIG. 2A is a diagrammatic illustration of a magnetic tape having three parallel sets of linear servo edges, each servo edge comprising an interface between two dissimilar recorded servo signals;

FIG. 2B is a block diagram showing one embodiment of a magnetic tape head;

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to calibrate servo sensors tracking servo signals recorded on a magnetic tape. The following description of Applicant's apparatus and method is not meant, however, to limit Applicant's invention to magnetic tapes or to data processing applications, as the invention herein can be applied generally to calibrating transducers in an electrically noisy environment.

Figure 1:
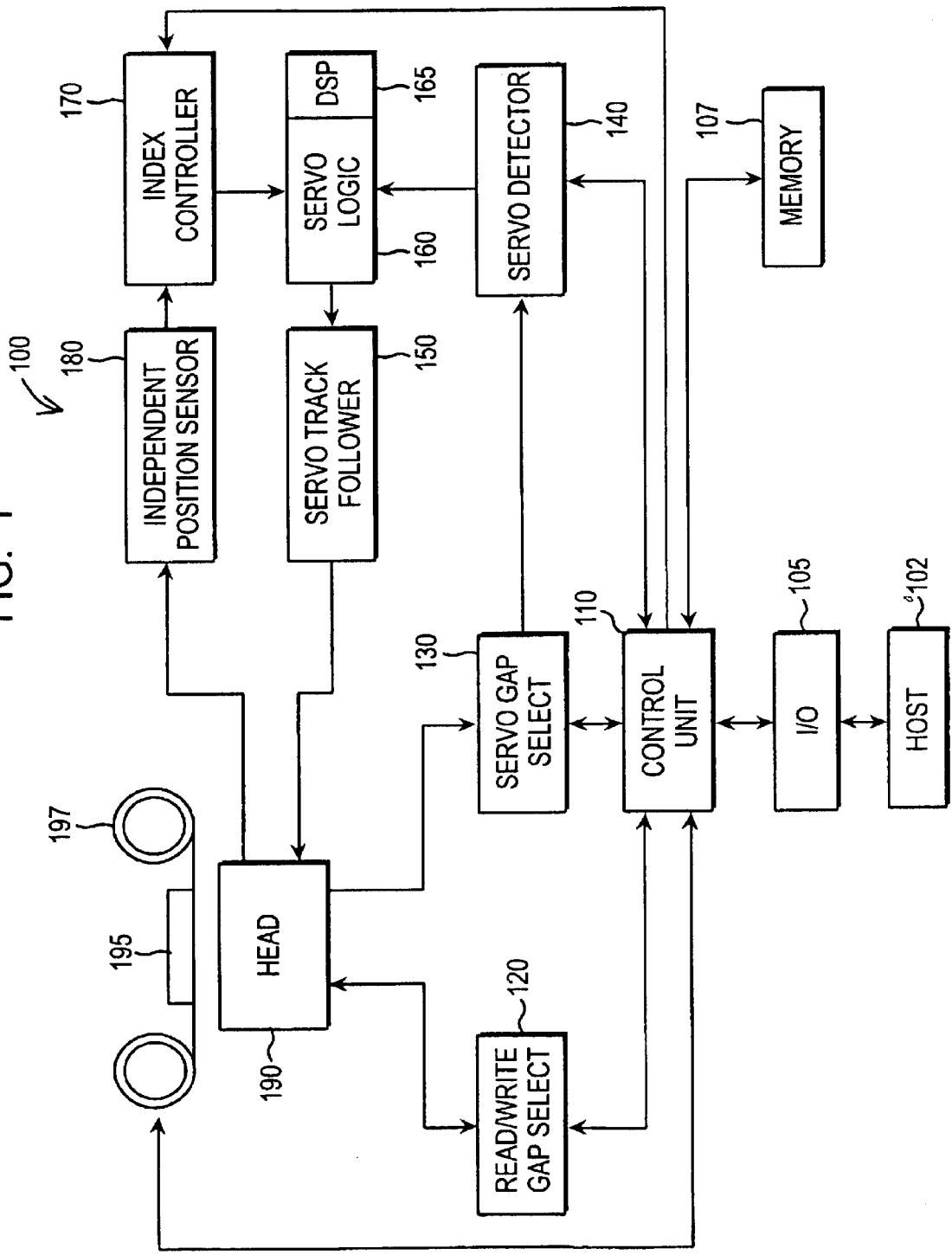
FIG. 1 is a block diagram of an embodiment of a magnetic tape system employing the present invention for calibration of servo index positions.

FIG. 1 shows magnetic tape data storage system 100. Control unit 110 receives and transmits data and control signals to and from a host device 102 via an interface 105. The control unit 110 is coupled to a memory device 107, such as a random access memory for storing information and computer programs. An example of a host device 102 comprises an IBM RS/6000 processor.

A multi-element tape head 190 includes a plurality of read/write elements to record and read information onto and from a magnetic tape 197, and servo sensors to detect servo signals comprising prerecorded linear servo edges on the magnetic tape 197. In certain embodiments, magnetic tape head 190 comprises a thin-film magneto-resistive transducer. In an illustrative embodiment, tape head 190 may be constructed as shown in FIG. 2B. The length of the tape head 190 substantially corresponds to the width of the tape 197. In certain embodiments tape head 190 includes thirty-two read/write element pairs (labeled "RD" and "WR") and three sets of servo read elements (e.g. LS1 272, RS6 298) corresponding to the three servo areas AB (FIG. 2A), BC (FIG. 2A), and CD (FIG. 2A). In the illustrated embodiment, the thirty-two read/write element pairs are divided into groups of eight, adjacent groups being separated by two tracks occupied by a group of four servo sensors. Each group of four servo sensors may be referred to as a "servo group", e.g. servo group 255, servo group 265, and servo group 275.

In the illustrated embodiments, tape head 190 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

A tape reel motor system (not shown in FIG. 1) moves the tape 197 along a tape path 195 in a first direction, and optionally in an opposing second direction, along a first axis, i.e. the longitudinal axis of the tape, while it is supported by a tape deck for reading and writing. The tape deck does not precisely hold the tape in position laterally. Rather, open channel guiding may be employed in which the magnetic tape can move laterally a distance which is substantially greater than that between index positions, thereby introducing substantial guiding noise into the calibration process. The guiding signal to noise ratio thus becomes negative, with the guiding noise being far larger than the step from one ratio to another, making it difficult to gather data points with a monotonically increasing or decreasing slope to conduct a calibration of the detected servo signal ratios.

A servo track follower 150 directs the motion of the magnetic tape head 190 in a lateral or transverse direction relative to the longitudinal direction of tape motion. The control unit 110 is coupled to one or more tape reel motors and controls the direction, velocity and acceleration of the tape 197 in the longitudinal direction.

The data tracks on the tape 197 are arranged in parallel and are parallel to the linear servo edges. Thus, as the servo track follower 150 causes the servo sensors of the magnetic tape head to track follow a linear servo edge or a servo index position laterally offset from a servo edge, the read/write elements track a parallel group of the data tracks. If it is desired to track another parallel group of data tracks, the magnetic tape head 190 is indexed laterally to another servo edge or to another servo index position, or a different servo sensor is aligned with the same or a different servo edge or servo index position.

When the magnetic tape head 190 is to be moved to a selected index position, an index controller 170 is enabled by the control unit 110, receiving a lateral position signal from an independent position sensor 180 and transmits an appropriate signal to servo logic 160 to select the appropriate servo track, while the control unit 110 transmits an appropriate signal to a servo gap selector 130 to select the appropriate servo sensor. The independent position sensor 180 is discussed in the incorporated U.S. Pat. No. 5,946,159, where it is called a non-servo position sensor, and indicates the lateral mechanical position of the tape head 190 with respect to the tape path 195.

Over the course of longer distances of longitudinal tape movement, the open channel guiding system will allow the tape to move laterally with respect to the tape deck. In accordance with the present invention, the independent position sensor 180, in limited distances of tape movement, accurately tracks the lateral mechanical position of the tape head 190, and therefore of the servo sensor(s), with respect to the magnetic tape 197 and of the servo edges. The logic 160 operates the servo track follower 150 in accordance with the present invention to calibrate the servo index positions as sensed by the servo sensor with respect to the parallel sets of linear servo edges, as will be explained. The logic 160 may comprise a programmed PROM, ASIC or microprocessor.

The tape system 100 may be bidirectional, in which ones of the read/write elements are selected for one direction of longitudinal tape movement, and others of the read/write elements are selected for the opposite direction of movement. The control unit 110 additionally selects the appropriate ones of the read/write elements by transmitting a signal to a read/write gap select unit 120.

Once a servo edge or edges are selected, the servo gap selector 130 provides the servo signals to a servo detector 140, which information is employed by servo logic 160 to position the tape head 190 to track follow the detected edges. In accordance with the present invention, servo logic 160 employs the servo information sensed by the servo detector 140 and the mechanical positioning information from the independent position sensor 180 to calibrate the track following servo. The track following servo logic is also implemented in the servo logic 160 employing the sensed servo signals to determine the ratios of the sensed servo signals, which are employed in accordance with the present invention to calibrate the servo index positions of the track following servo 150.

Referring to FIG. 2A, a plurality, for example, three, parallel sets of linear servo edges 250, 260 and 270 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors, i.e. servo sensor groups 255 (FIG. 2B), 265 (FIG. 2B), 275 (FIG. 2B), are disposed on tape head 190 to sense the servo signals at each corresponding edge. Additional pluralities of servo sensors, i.e. sensors 272, 274, 276, 278, may be provided to allow positioning of the tape head at additional data tracks.

Figure 3A:
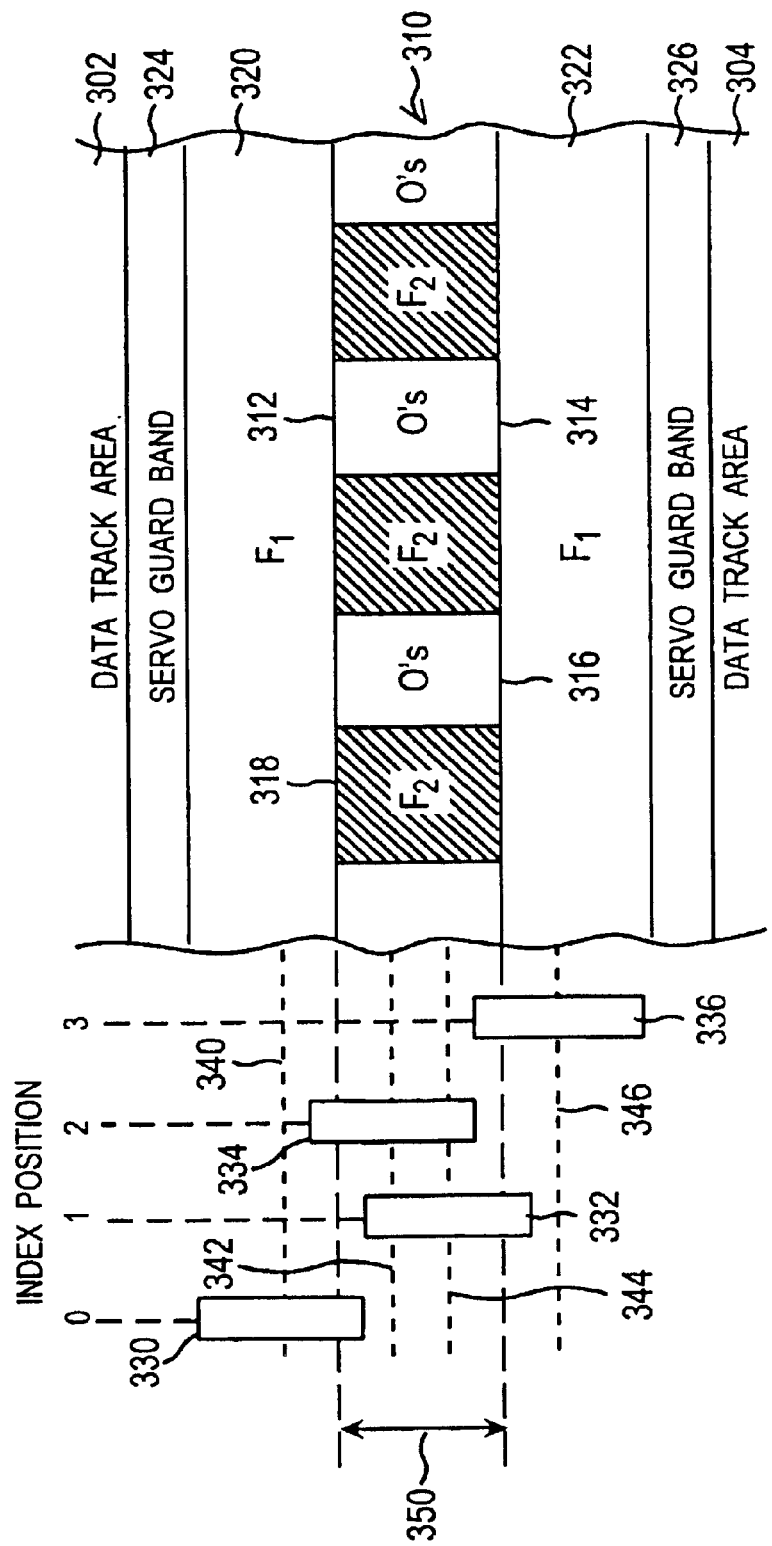
FIG. 3A is a detailed diagrammatic representation of a magnetic tape format providing four servo index positions in one set of two linear servo edges of the magnetic tape of FIG. 2A.

Referring to FIG. 3A, the typical magnetic tape format of servo signals to form linear servo edges 312 and 314 comprising an interface between two dissimilar recorded servo signals is illustrated. One set of servo edges comprises outer bands 320 and 322, having a recorded pattern of a constant amplitude signal of a single first frequency, on either side of an inner band 310 of the other servo signal, having a recorded pattern alternating between a constant amplitude burst signal 318 of a single second frequency and a zero amplitude null signal 316. Typically, the servo signals 320, 310 and 322 are provided with servo guard bands 324 and 326 to protect the outer bands 320 and 322 from noise resulting from the data track areas 302 and 304.

It is desirable that the servo edges are separated by a predetermined nominal distance 350 employed for prerecording the servo signals. Typically, the outer servo signals 320, 322 are recorded first, and the center servo signal 310 is recorded last, to provide the servo edges 312, 314. There is, typically, variation in the magnetic separation 350 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation 350 distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks. Thus, the difference in physical distance and the amplitude compensation may tend to offset each other with respect to the resultant apparent distance between the servo tracks. These actions may provide an adequate signal for track following at the servo edges.

However, to increase data track density, in the embodiment of FIG. 3A four servo index positions, i.e. index positions 0, 1, 2, and 3, are calibrated. These index positions are laterally offset with respect to the sensed servo edges of the set of linear servo edges. Index position 0 corresponds to sensor placement 330 over tape track position 340. Similarly, index positions 1, 2, and 3, respectively, correspond to sensor placements 332, 334, and 336, respectively, over tape track positions 342, 344, and 346, respectively. The relative positions of these four index positions are: 0, 2, 1, 3.

As an example, the servo index positions may be offset laterally about one quarter the width of the inner band 310 away from the servo edge in either direction, providing four index positions. The indexed positions are determined by measuring the ratios between the amplitudes of the two dissimilar recorded servo signals, e.g., as measured by the servo detector 140 of FIG. 1, and mapping those ratios into physical distances in microns. The servo logic 160 operates the servo track follower 150 to track follow at the desired measured ratio. For example, the measured ratio will be the ratio between the sum of the sensed outer band signal 320 plus the inner band signal 318, and the sensed outer band signal 320, giving effect to the null 316. The illustrations and descriptions herein employ this ratio.

Alternatively, the measured ratio may be the ratio between the outer band signal 320 at frequency F1 and the inner band signal 318 at frequency F2. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

Figure 3B:
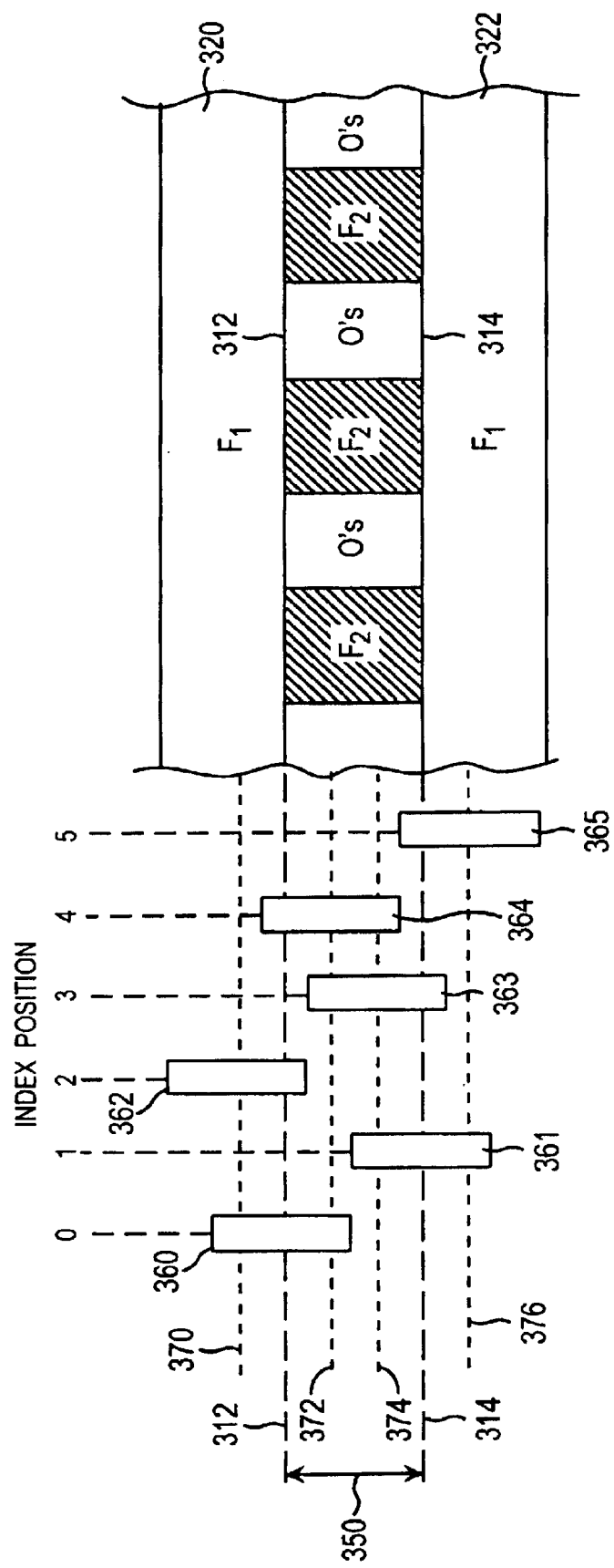
FIG. 3B is a detailed diagrammatic representation of a magnetic tape format providing six servo index positions in one set of two linear servo edges of the magnetic tape of FIG. 2A.

FIG. 3B illustrates another embodiment of displaced index positions that may be employed with the present invention. This embodiment includes six index positions, i.e. index positions 0, 1, 2, 3, 4, and 5. At the "0" or "1" index positions, the servo element is located at position 360 centered on servo edge 312 or at position 361 centered on servo edge 314. Additional index positions are provided which are aligned such that a servo element is displaced from an edge 312 or 314 in either direction. As the result, the number of index positions becomes six. The relative positions of these six index positions are: 2, 0, 4, 3, 1, 5.

In order to center the data read/write elements in the "2" and "5" index positions, the servo read element must be located at position 362 or at position 365, and will read a minimum signal that has an amplitude ratio of about 5/6 of the maximum signal, and to center the data read/write elements in the "3" and "4" index positions, the servo read element must be located at position 363 or at position 364, and will read a minimum signal that has an amplitude ratio of about 1/6 of the maximum signal.

To track follow an edge or edges, once a servo edge or edges are selected, the servo gap selector 130 of FIG. 1 provides the servo signals to a servo detector 140, which digitally detects the servo signals at a predetermined sample rate, and provides servo signal ratios of each of the selected servo sensors. The servo logic 160 employs the servo signal ratios to determine the displacement from the edges and operates the servo loop servo track follower 150 to position the tape head 190 to track follow at the desired displacement from the edges.

Figure 4A:
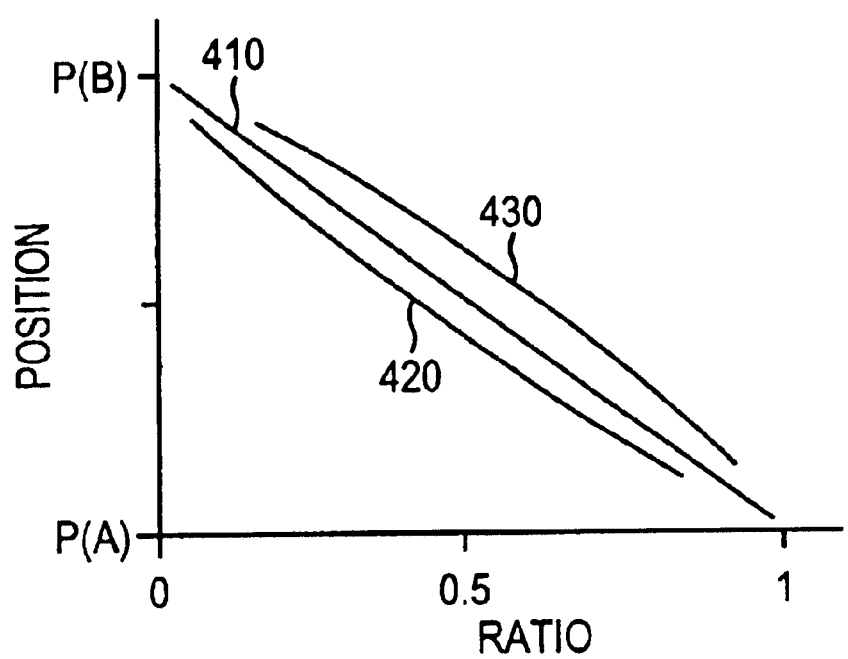
FIG. 4A is a diagrammatic representation of the relationships between ratios of the sensed servo signals of a servo edge of FIG. 2A and their corresponding lateral positions, where the recorded servo signals generating the edge are of three different amplitudes.

FIG. 4A illustrates examples of distortion of the measured ratios between the sensed servo signals of one linear servo edge, at various lateral positions of the servo sensors, in a guided tape system. Referring additionally to FIGS. 3A and 3B regarding servo sensor placement, in an ideal relationship, the ratio of signals varies linearly from a value of "1" when the servo sensor is at position $P_{(A)}$, which is centered on and senses only the outer band 320 or outer band 322, to a value of "0" when the servo sensor is at position $P_{(B)}$, which is centered on and senses only the inner band 310. Straight line 410 graphically illustrates such an ideal relationship.

Figure 4B:
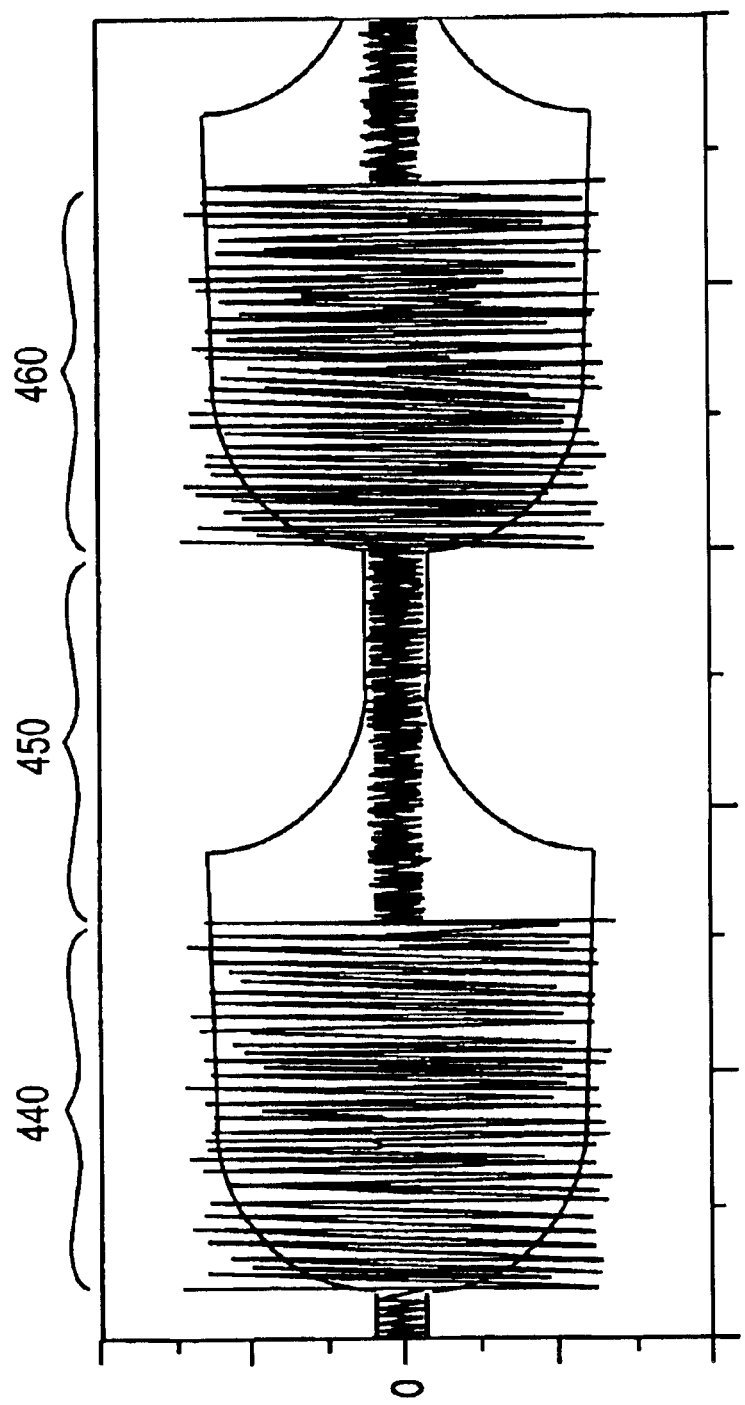
FIG. 4B shows analog servo signals detected at a first index position.
Figure 4C:
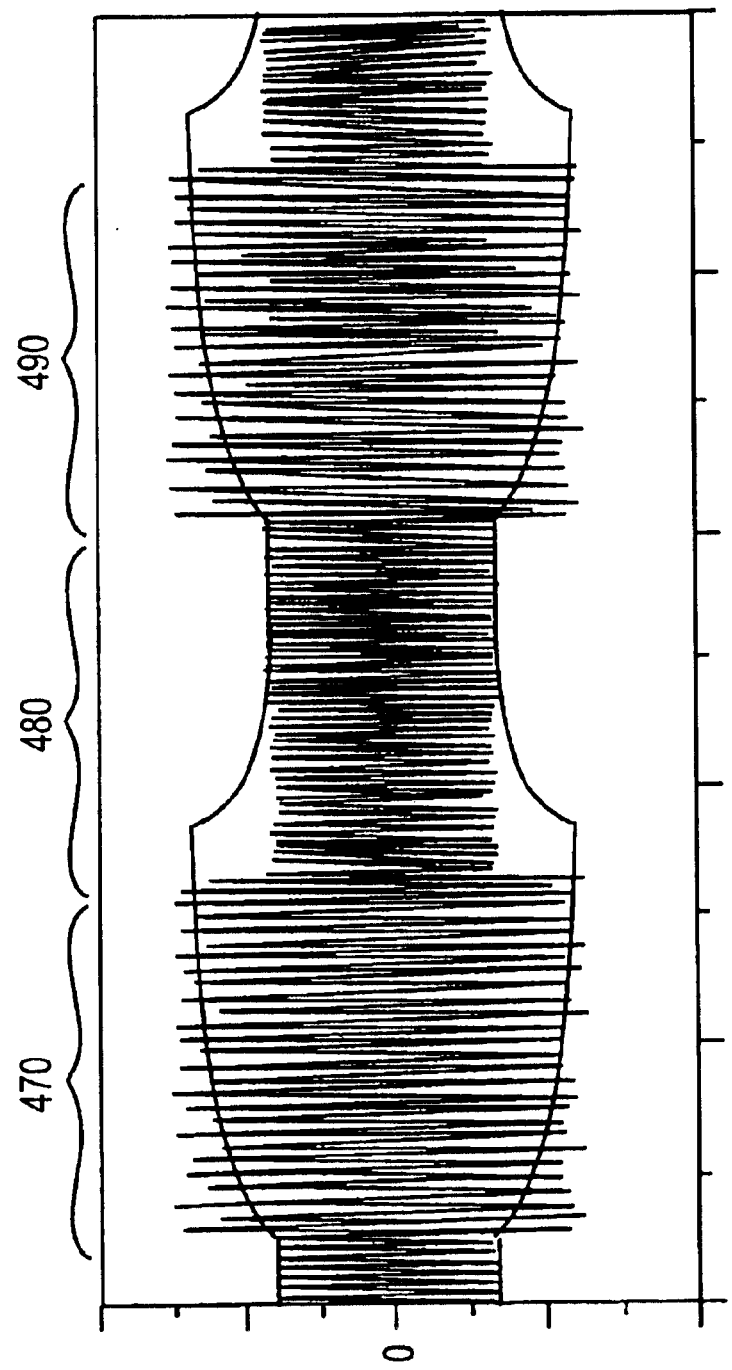
FIG. 4C shows analog servo signals detected at a second index position.

Curve 420 comprises a graphical representation of more typical ratio of servo signals, measured in a guided system, where the center recorded servo signal 310 generating the edges is of a relatively weak amplitude. FIGS. 4B and 4C illustrate wave forms of the analog signal from the servo transducer at, respectively, positions 332 and 336 of FIG. 3A. Thus, in FIG. 4B, the bursts 440 and 460 formed while the servo transducer is at position 332 of FIG. 3A from the combination of the first frequency and the second frequency burst is at a high amplitude, but the burst 450 formed from the combination of the first frequency and the null signal is at a very low amplitude because only a small portion of the servo transducer is positioned over the first frequency. In FIG. 4C, the bursts 470 and 490 formed while the servo transducer is at position 336 of FIG. 3A from the combination of the first frequency and the second frequency burst is at a high amplitude, as is the burst 480 formed from the combination of the first frequency and the null signal, because the servo transducer is positioned primarily over the first frequency.

Referring again to FIG. 4A, curve 430 comprises a graphical representation of more typical ratio of servo signals as a function of servo sensor location, measured in a guided system, where the center recorded servo signal 310 generating the edges is of a relatively strong amplitude. As those skilled in the art will appreciate, curves 420 and 430 do not define linear relationships between the ratios of measured servo signals and servo sensor placement. In light of the differing, and complex, relationship between the ratio of measured servo signals as a function of servo sensor location, employing the same ratio setting to position the tape head at various servo index positions for each of the linear edges may result in track misregistration.

As discussed above, the tape deck does not precisely hold the tape in position laterally. Rather, open channel guiding may be employed whereunder the magnetic tape can move laterally a distance which is substantially greater than that between index positions, e.g., index positions 340–346 of FIG. 3A and index positions 370, 312, 372, 374, 314, and 376 of FIG. 3B, thereby introducing substantial noise into the calibration process. The guiding signal to noise ratio thus becomes negative, with the guiding noise being far larger than the step from one ratio to another, making it difficult to gather data points with a monotonically increasing or decreasing slope to conduct a calibration of the detected servo signal ratios.

In one embodiment of the present invention, servo logic 160 is provided with digital signal processor 165, and is coupled to the servo detector 140, the servo track follower 150, and the independent position sensor 180, all of FIG. 1. The logic 160 operates the servo loop, comprising servo gap selector 130, servo detector 140, and servo track follower 150, to inject a defined signal to modulate the lateral position of the head and, thereby, a plurality of servo sensors.

Figure 5A:
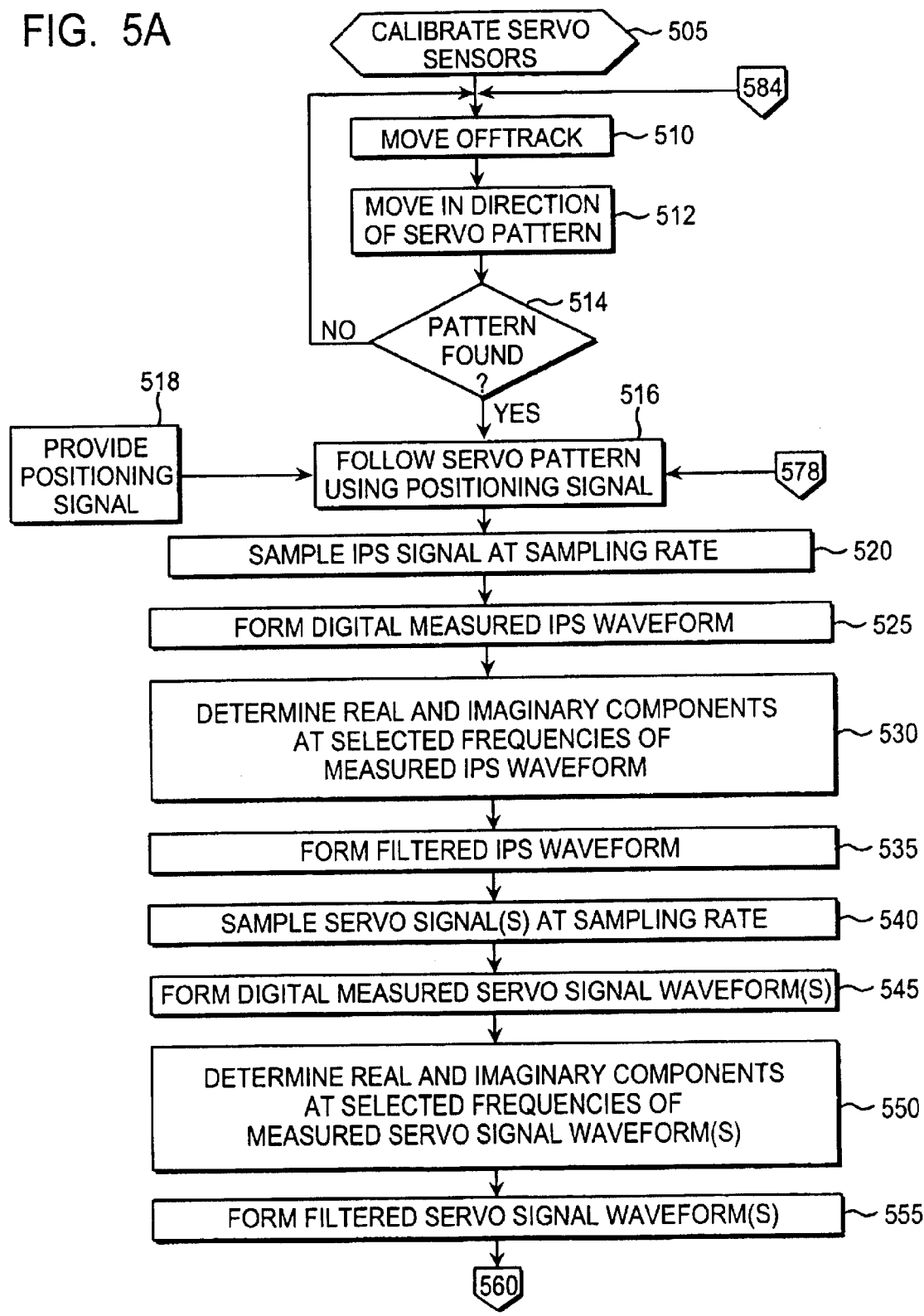
FIG. 5A is a flow chart summarizing the initials steps of Applicants' method.

Referring now to FIG. 5A, Applicants' method to calibrate one or more servo sensors begins at step 505. In step 510, Applicants' method operates the servo loop to move off-track to begin calibration of the servo sensor(s). In certain embodiments, step 510 is performed by logic 160. In certain embodiments, Applicants' method calibrates one or more servo sensors across a range which includes four servo index positions, i.e., positions 340–346 of FIG. 3A. In certain embodiments, Applicants' method calibrates one or more servo sensors across a range which includes six index positions, i.e. positions 370, 312, 372, 374, 314, and 376 of FIG. 3B. In certain embodiments, Applicants' method calibrates one or more servo sensors across a range which includes more than six servo index positions.

In step 512, Applicants' method operates the servo loop to move in the direction of the servo pattern, such as pattern 250 (FIG. 2A), or 260 (FIG. 2A), or 270 (FIG. 2A), in order to find and lock to the pattern. In certain embodiments, step 512 is performed by logic 160. Applicants' method transitions from step 512 to step 514 wherein Applicants' method determines whether the servo pattern has been found. In certain embodiments, step 514 is performed by logic 160. If Applicants' method determines in step 514 that the servo pattern has not been found, then Applicants' method transitions from step 514 to step 510 to repeat the movement off-track.

Alternatively, if Applicants' method determines in step 514 that the servo pattern has been located, Applicants' method transitions from step 514 to step 516 wherein Applicants' method follows the servo pattern on the moving tape by causing the servo loop to laterally position the servo sensor to detect the servo signals at continually altered digital set points of the ratios of the sensed servo signals. In certain embodiments, step 516 is performed by logic 160.

The set points are altered at a predetermined sampling rate, and are altered to inject a predetermined positioning signal, whereby the servo loop track follows the linear servo edges, e.g., edges 312 or 314 of FIGS. 3A and 3B at each of the parallel sets of linear servo edges 250 (FIG. 2A), 260 (FIG. 2A), 270 (FIG. 2A), with the corresponding plurality of laterally offset servo sensors, i.e. sensor groups 255 (FIG. 2B), 265 (FIG. 2B), 275 (FIG. 2B), at the continually altered digital set points.

In certain embodiments, this predetermined positioning signal comprises a sinusoidal pattern having a known reference frequency. In certain embodiments, the positioning signal is recorded in firmware disposed in logic 160. In certain embodiments, the positioning signal comprises a sinusoidal pattern having a varying frequency. In certain embodiments, the positioning signal is varied according to an algorithm disposed in logic 160.

In certain embodiments, the reference frequency is set in "firmware" disposed in DSP 165. In certain embodiments, the reference frequency is set by the user during system initialization. In certain embodiments, the reference frequency is set by field service personnel during system initialization. In certain embodiments, the reference frequency is modified by Applicants' method in order to further refine the calibration of the servo sensors disposed in the system.

In certain embodiments, the positioning signal comprises a reference frequency selected such that the reference frequency, and major harmonics thereof, each differs from intrinsic operational frequencies of the track following servo system and/or of the tape drive. As examples, the positioning signal is selected so that the reference frequency and major harmonics thereof differ from the frequencies of the tape reels 197 of FIG. 1, the tape motor(s), and the cooling, fans, and any resonant frequencies of the servo system.

In certain embodiments, the positioning signal is modulated such that the ratio of servo signals detected by the one or more servo sensors being calibrated, i.e. the ratio of the detected amplitudes of F1 and F2, varies from about 0.1 to a ratio of about 0.9. Those detected servo signals are dominated by the sinusoidal pattern and not by the tape movement. The frequency of the positioning signal, i.e. the reference frequency, is known precisely, and signals not having that reference frequency, or harmonics of that reference frequency, comprise noise in the measurement.

Independent position sensor ("IPS") 180 measures the position of tape head 190 with respect to the tape path 195. In step 520, Applicants' method samples the analog IPS signal at the selected sample rate. In certain embodiments, step 525 is performed by servo logic, such as logic 160. Applicants' method transitions from step 520 to step 525 wherein Applicants' method digitally forms a measured IPS waveform using the data of step 520. In certain embodiments, step 525 is performed by servo logic, such as logic 160.

Figure 6:
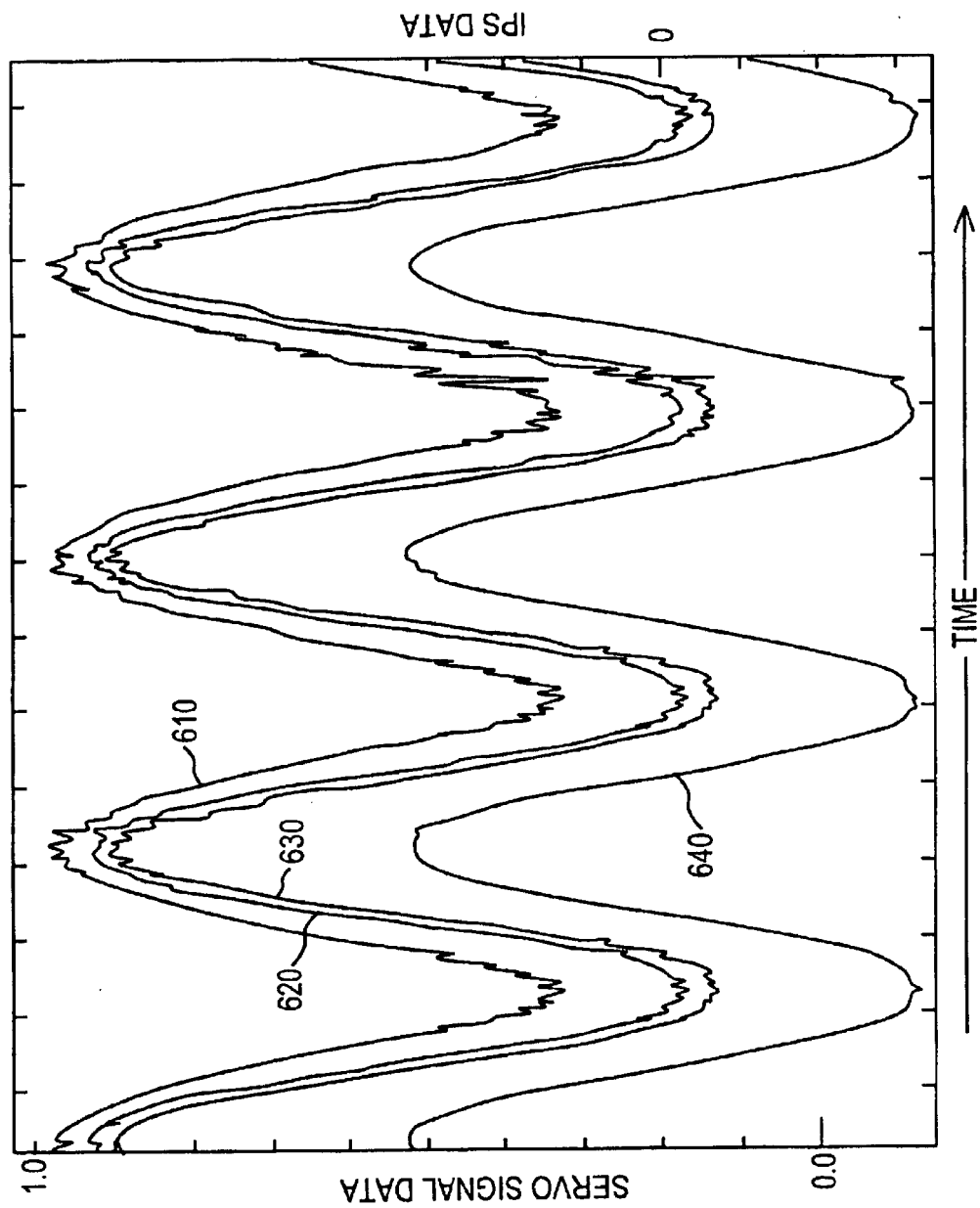
FIG. 6 is a graph showing a measured independent sensor waveform and three sampled servo signal waveforms.

Referring now to FIG. 6, waveform 640 comprises the measured IPS signal waveform formed in step 525. The Y axis corresponding to curve 640 is found at the right side of graph 600. The digitized measured IPS signal waveform of step 525 is dominated by the sinusoidal pattern having the reference frequency, and not by the tape movement. The frequency of the reference frequency is known precisely, and anything that is not at that reference frequency, or its harmonics, comprises noise in the measurement.

Applicants' method transitions from step 525 to step 530 wherein Applicants' method determines the real and imaginary components, at selected frequencies, of the measured IPS waveform of step 525. In certain embodiments of Applicants' invention, those real and imaginary components are formed using a Goertzel algorithm. In certain embodiments, Applicants' method uses a Goertzel algorithm defined by equation (1)

$$H\ f_i(z) = \left[1 - e^{(2\pi f_i/f_s)z^{-1}}\right] / 1 - 2\cos[2\pi f_i/f_s]z^{-1} + z^{-2} \quad (1)$$

where $f_i$ is the frequency of interest, and $f_s$ is the sampling frequency. In certain embodiments, Applicants' method includes second order recursive Goertzel filter I.

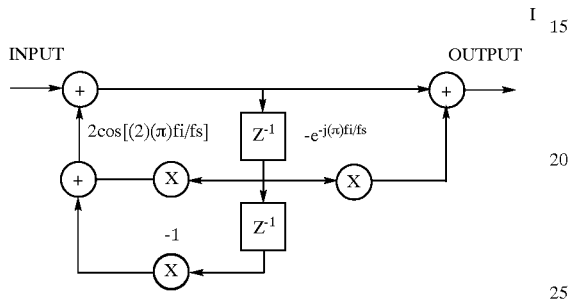

In certain embodiments, DSP component 165 includes a Goertzel filter.

In certain embodiments, the measured IPS waveform of step 525 comprises the input to a Goertzel filter, and the real and imaginary components of step 530 comprise the output of that Goertzel filter. In certain embodiments, servo logic 160 (FIG. 1) provides the waveform of step 525 to a Goertzel filter in DSP component 165 (FIG. 1).

In certain embodiments, the selected frequencies comprise (P) harmonics of the reference frequency. As (P) increases, Applicants' method can identify more complex distortions of the detected servo signal ratios as a function of IPS location. In certain embodiments, Applicants' method utilizes as many of 6 harmonics of the reference frequency, i.e. (P) equals 6. On the other hand, in certain embodiments Applicants' have found an insubstantial increase in useful information beyond the fourth harmonic.

In step 535, Applicants' method uses the real and imaginary components of step 530 to form a filtered IPS signal waveform. The real components of the measured IPS waveform determined in step 530 are used in step 535 to determine the magnitudes M(i) for that IPS waveform at the selected frequencies, where (i) is an integer between 1 and (P). The imaginary components of the measured IPS waveform are used in step 535 to determine the phase φ(i) of that IPS waveform at the selected frequencies, wherein (i) is as described above.

For example, in embodiments wherein Applicants' method uses the first four harmonics of the reference frequency, (i) is an integer greater than or equal to 1 and less than or equal to 4. $M_{(1)}$ comprises the magnitude of the measured IPS waveform at the reference frequency. As those skilled in the art will appreciate, the first harmonic is identical to the fundamental frequency, i.e. the reference frequency. $M_{(2)}$ comprises the magnitude of the measured IPS waveform at the second harmonic of the reference frequency, $M_{(3)}$ comprises the magnitude of the measured IPS waveform at the third harmonic of the reference frequency, and $M_{(4)}$ comprises the magnitude of the measured IPS waveform at the fourth harmonic of the reference frequency.

Similarly, $\phi_{(1)}$ comprises the phase of the measured IPS waveform at the reference frequency, $\phi_{(2)}$ comprises the phase of the measured IPS waveform at the second harmonic of the reference frequency, $\phi_{(3)}$ comprises the phase of the measured IPS waveform at the third harmonic of the reference frequency, and $\phi_{(4)}$ comprises the phase of the measured IPS waveform at the fourth harmonic of the reference frequency.

In step 535, Applicants' method forms a filtered IPS signal waveform using the magnitudes $M_{(i)}$, phases $\phi_{(i)}$, and the equation:

$$\begin{aligned}\text{Filtered IPS Signal Waveform} = &\ M_{(1)} * \cos[\phi_{(1)} + (2)(\pi)(t)/x] + \\ &\ M_{(2)} * \cos[\phi_{(2)} + (4)(\pi)(t)/x] + \\ &\ M_{(3)} * \cos[\phi_{(3)} + (6)(\pi)(t)/x] + \\ &\ M_{(4)} * \cos[\phi_{(4)} + (8)(\pi)(t)/x]\end{aligned}$$

where (t)/x comprises a fraction having a value greater than or equal to 0 and less than or equal to 1, where multiplying that fraction by (n)π gives a point within the (n)π period.

Thus, Applicants' method in steps 520, 525, 530, and 535, processes the measured IPS signal wherein the tape guiding noise is dominant, to form a filtered IPS signal waveform wherein the signal of interest comprise a sinusoidal pattern at a known reference frequency. In this filtered waveform, the noise, not only the tape guiding noise, but also noise resulting from tape defects, has been effectively removed.

In step 540, Applicants' method samples, at the selected sampling rate, one or more servo signals. The sampling of step 540 is performed concurrently with the sampling of step 520. In certain embodiments, the one or more servo sensors each provide an analog signal to a servo detector, such as servo detector 140 (FIG. 1), and the servo detector forms one or more servo signals comprising ratios of the detected first frequency and detected second frequency. The servo detector then provides those one or more servo signals to the servo logic, such as logic 160 (FIG. 1). In certain embodiments, the servo sensors provide the servo signals comprising the ratios of detected signals.

Applicants' method transitions from step 540 to step 545 wherein Applicants' method digitally forms one or more measured servo signal waveforms using the data obtained in step 540. Referring again to FIG. 6, waveforms 610, 620, and 630 comprise the measured servo signal waveforms formed in step 545. The Y axis corresponding to curves 610, 620, and 630, is found at the left side of graph 600. As those skilled in the art will appreciate, in the embodiment of FIG. 6 Applicants' method includes using three servo sensors and one IPS sensor.

Applicants' method transitions from step 545 to step 550 wherein Applicants' method determines the real and imaginary components of each of the measured servo signal waveforms of step 545. In certain embodiments, step 550 includes using a Goertzel algorithm as described above. In certain embodiments, step 550 includes using a Goertzel filter as described above.

Applicants' method transitions from step 550 to step 555 wherein Applicants' method forms one or more filtered servo signal waveforms using the real and imaginary components determined in step 550. When forming, for example, the (j)th filtered servo signal waveform using the real and imaginary components of the (j)th measured servo signal waveform at the (P) harmonics of the reference frequency, Applicants' method in step 555 uses the magnitude $M_{(i)(j)}$ determined from real components of the (j)th measured servo signal waveform at the (i)th harmonic of the reference frequency, and the phase $\phi_{(i)(j)}$ determined from the imaginary components of that (j)th measured waveform at the (i)th harmonic of the reference frequency, wherein (i) is an integer greater than or equal to 1 and less than or equal to (P).

The DC component of the measured servo signal waveforms is also kept so as to provide an offset between the plurality of servo sensor channels. $M_{(0)(j)}$ comprises that DC component for the (j)th measured servo signal waveform. Further in step 555, Applicants' forms the (j)th filtered servo signal waveform using the equation:

$$(j)th\ filtered\ servo\ signal\ waveform = M_{(0)(j)} +$$
$$M_{(1)(j)} * \cos[\phi_{(1)(j)} + (2)(\pi)(t)/x] +$$
$$M_{(2)(j)} * \cos[\phi_{(2)(j)} + (4)(\pi)(t)/x] +$$
$$M_{(3)(j)} * \cos[\phi_{(3)(j)} + (6)(\pi)(t)/x] +$$
$$M_{(4)(j)} * \cos[\phi_{(4)(j)} + (8)(\pi)(t)/x]$$

where (t)/x comprises a fraction having a value greater than or equal to 0 and less than or equal to 1, where multiplying that fraction by (n)π gives a point within the (n)π period.

Thus, Applicants' method in steps 540, 545, 550, and 555, processes the detected servo signals wherein the tape guiding noise is dominant, to form one or more filtered servo signal waveforms wherein the signal(s) of interest comprise a sinusoidal pattern at a known reference frequency. In these filtered waveforms, the noise, not only the tape guiding noise, but also noise resulting from tape defects, has been effectively removed.

Figure 5B:
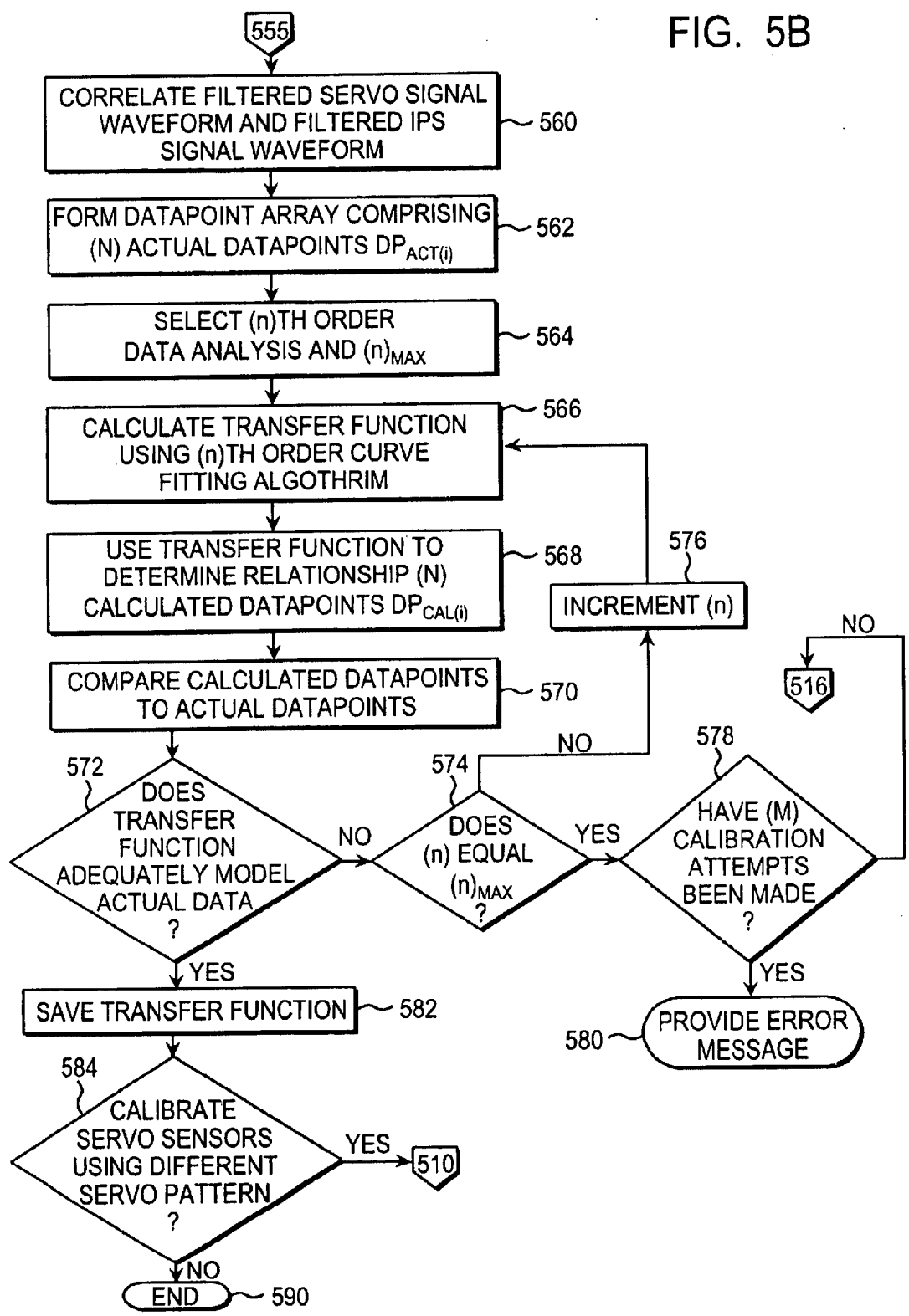
FIG. 5B is a flow chart summarizing additional steps of Applicants' method.

Applicants' method transitions from step 555 to step 560. Referring now to FIG. 5B, in step 560, Applicants' method correlates each of the one or more filtered servo signal waveforms of step 555 with the filtered IPS signal waveform of step 535. As those skilled in the art will appreciate, one such correlation comprises graphing the one or more filtered servo signal waveforms against the filtered IPS signal waveform. Such a correlation comprises graphing a first sinusoidal function against a second sinusoidal function.

As those skilled in the art will appreciate, a Lissajous pattern comprises a graph of a first sinusoidal function having a first frequency plotted on the y axis combined with a second sinusoidal function having a second frequency plotted on the x axis, i.e. Y and X are both periodic functions of time t given by equations such as X=sin(w*n*t+c) and Y=sin w*t. Different patterns may be generated for different values of n (period shift) and c (phase shift).

Figure 9:
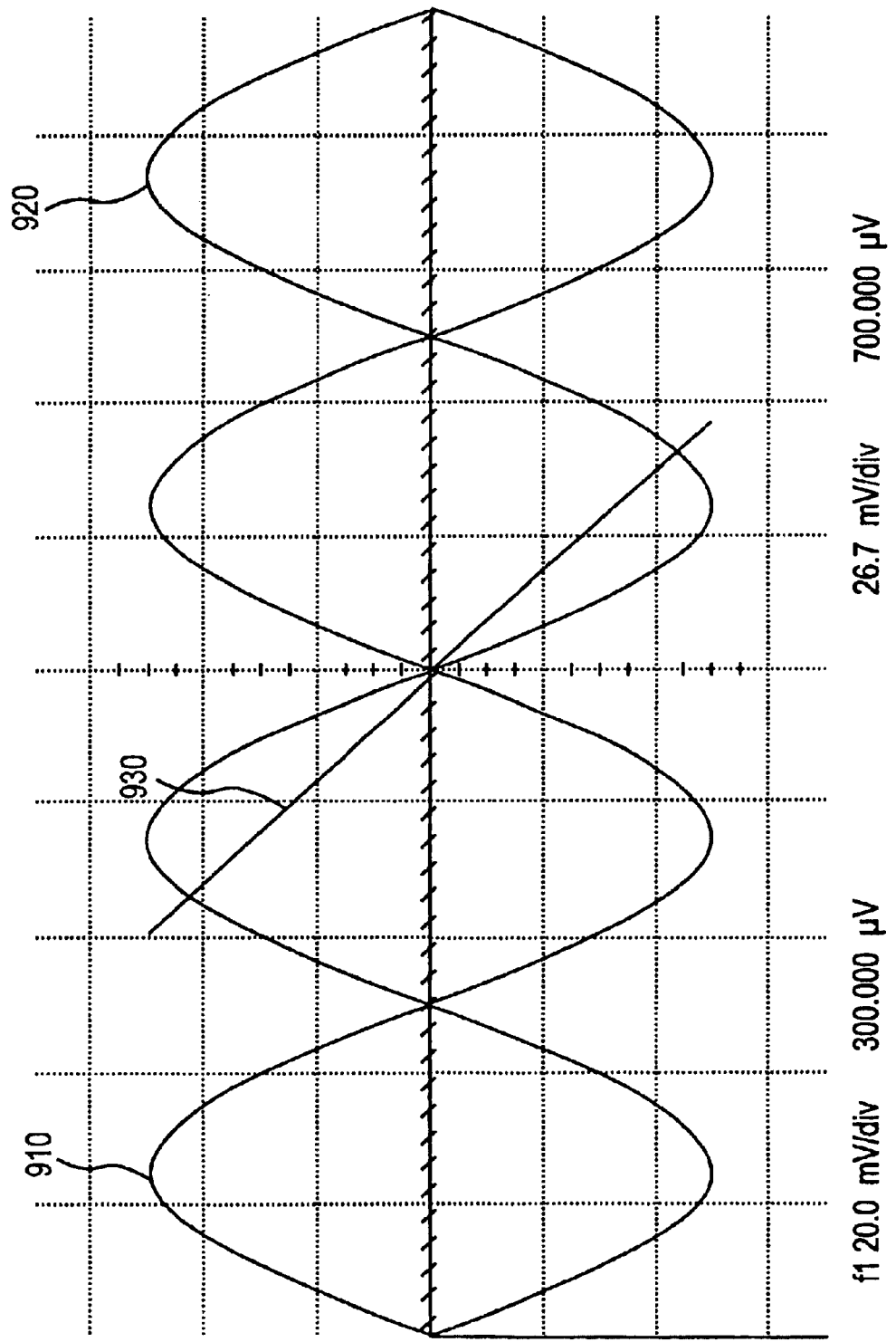
FIG. 9 shows a first periodic function graphed against an identical second periodic function.

If a linear relationship exists between sampled servo signals and measured IPS positions, then graphing the filtered IPS waveform formed in step 535 against the one of the filtered servo signal ratio waveforms of step 555 would give a straight line Lissajous pattern. For example referring to FIG. 9, if curve 910 comprises the filtered IPS waveform, and curve 920 comprises one of the filtered servo signal ratio waveforms, and graphing curve 910 against curve 920 gives straight line curve 930, then a linear relationship exists between the detected servo signal ratios and the measured IPS location. As those skilled in the art will appreciate, curve 910 and 920 have the same frequency, but are phase shifted by 180 degrees. Graphing sinusoidal functions having identical frequencies and phase shifted by 0 degrees similarly gives a straight line curve.

Figure 10:
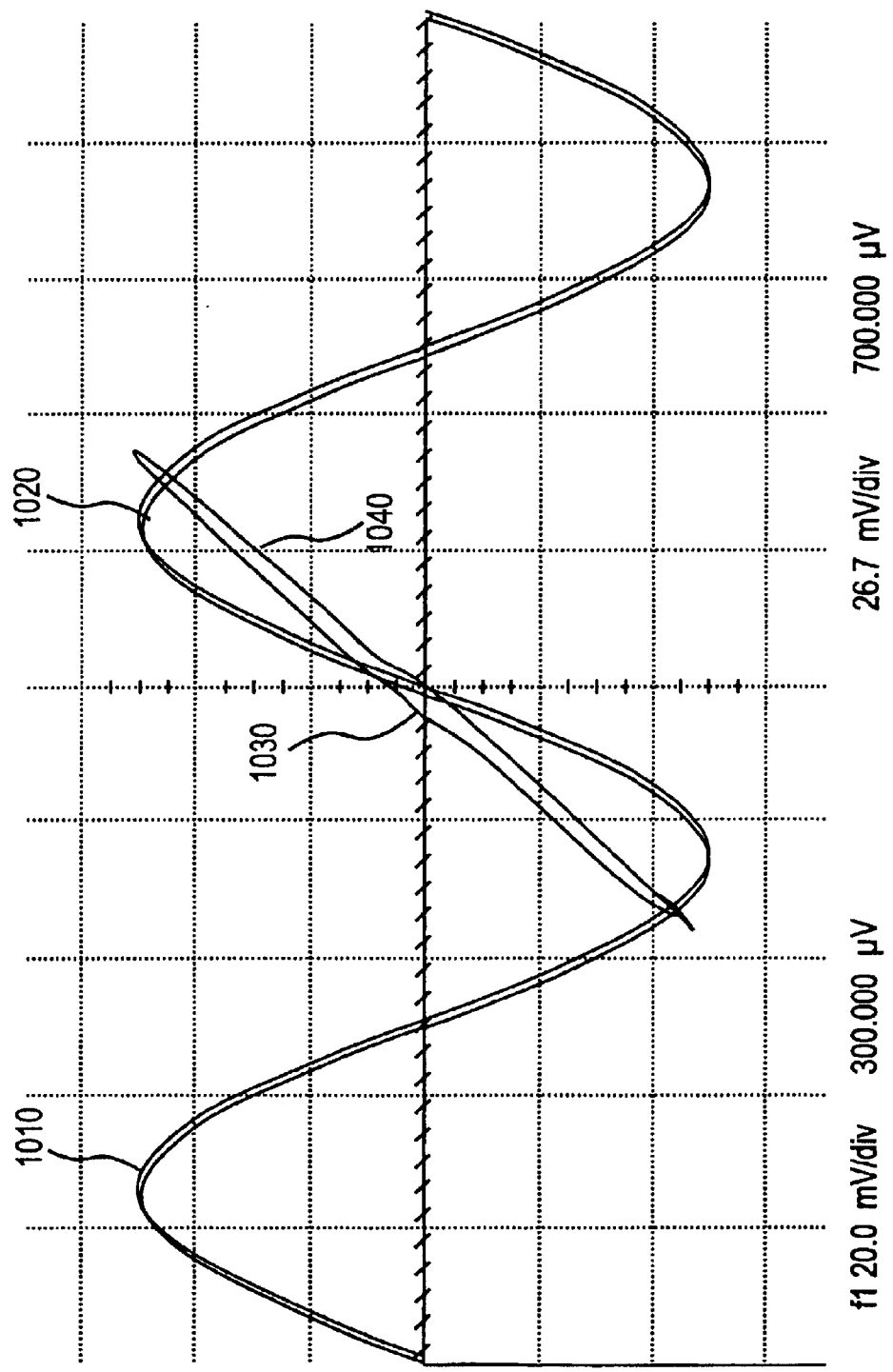
FIG. 10 shows a first periodic function graphed against a differing second periodic function.

Graphing differing periodic functions against one another gives more complex curves. Referring to FIG. 10, waveform 1010 differs from waveform 1020. Graphing waveform 1010 and against waveform 1020 gives curve 1030. As those skilled in the art will appreciate, the mathematical relationship between curve 1010 and curve 1020 cannot be accurately expressed as a linear function. On the other hand, a more complex function such as a quadratic function might adequately define the relationship between curves 1010 and 1020.

Figure 7:
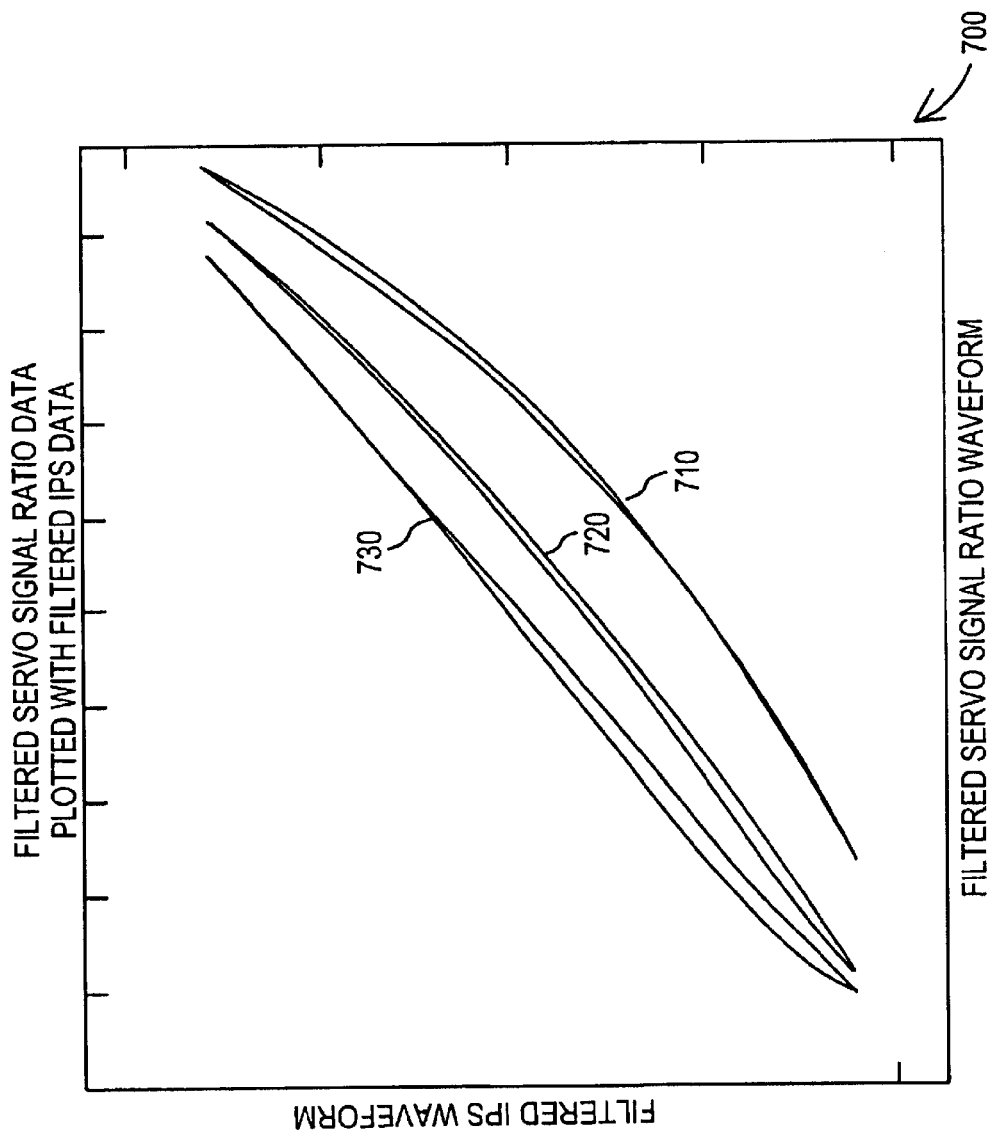
FIG. 7 shows a filtered independent sensor waveform graphed against three different filtered servo signal ratio waveforms.

FIG. 7 comprises graph 700 wherein the filtered servo signal waveforms of step 550, wherein (P) equals 3, are plotted against the filtered IPS waveform. Curve 710 comprises the filtered servo signal waveform derived from measured servo signal waveform 610 (FIG. 6) plotted against the filtered IPS waveform derived from measured IPS signal waveform 640 (FIG. 6). Similarly, curves 720 and 730, respectively, comprise the filtered servo signal waveforms derived from measured servo signal waveforms 620 (FIG. 6) and 630 (FIG. 6), respectively, plotted against the filtered IPS waveform.

As those skilled in the art will appreciate, curves 710, 720, and 730, are more complex than curve 930 or curve 1030. In certain embodiments, Applicants' method utilizes a second order curve fitting algorithm to model curves 710, 720, and 730. In other embodiments, Applicants' method utilizes a third order curve fitting algorithm to model curves 710, 720, and 730. In yet other embodiments, Applicants' method uses an (n)th order data analysis algorithm to model curves 710, 720, and 730, wherein (n) is 4, 5, or 6.

In step 562, Applicants' method forms (N) X/Y datapoint arrays using the correlation of step 560. Each X/Y array comprises a plurality of measured datapoints $DP_{ACT(i)}$. Each such datapoint $DP_{ACT(i)}$ comprises the IPS signal actually measured for a given measured servo signal. In certain embodiments, step 562 is performed by servo logic 160 (FIG. 1).

In step 566, Applicants' method forms (N) transfer functions using, where each of those (N) transfer functions is formed using one of X/Y data arrays of step 562 and an (n)th order regression algorithm. In step 564, that (n)th order is selected. In certain embodiments, step 564 further includes establishing a highest order curve fitting algorithm, i.e. $(n)_{MAX}$. In certain embodiments, a second order curve fitting algorithm is used. In certain embodiments, a third order curve fitting algorithm is used. In certain embodiments, one or more higher order curve fitting algorithms are used wherein (n) is 4, 5, or 6.

Figure 8:
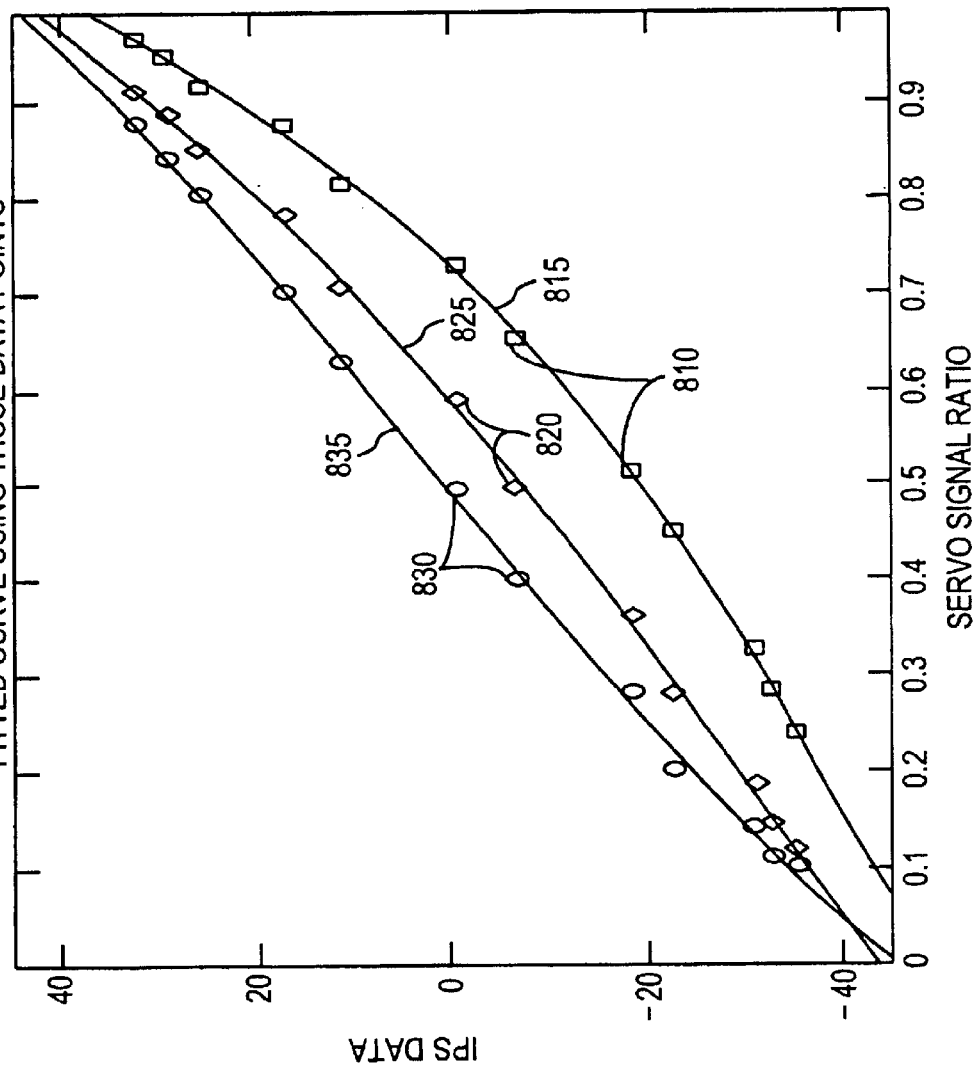
FIG. 8 three sets of datapoints representing the position of an independent position sensor as a function of the servo signal ratio values detected by three servo sensors.

Applicants' method transitions from step 566 to step 568 wherein Applicants' method forms (N) calibration curves using the (N) transfer functions of step 566. As those skilled in the art will appreciate, a calibration curve is formed for each servo sensor being calibrated. Each of those (N) calibration curves includes a plurality of calculated datapoints $DP_{CAL(i)}$. Referring now to FIG. 8, curves 815, 825, and 835, are derived using the transfer functions of step 566. FIG. 8 further recites three sets of measured datapoints 810, 820, and 830.

Applicants' method transitions from step 568 to step 570 wherein Applicants' method compares the measured datapoints $DP_{ACT(i)}$ for a given servo sensor with the calculated datapoints $DP_{CAL(i)}$ for that servo sensor. In certain embodiments, Applicants' method determines the residual error $RE_{(i)}$ for each actual datapoint by computing the difference between $DP_{ACT(i)}$ and $DP_{CAL(i)}$. In certain embodiments, Applicants' method establishes a maximum residual error $RE_{MAX}$, and compares each $RE_{(i)}$ to that $RE_{MAX}$. In certain embodiments, Applicants' method determines an average residual error $RE_{AVG}$ using the values for $RE_{(i)}$, and compares $RE_{AVG}$ to $RE_{MAX}$.

Applicants' method transitions from step 570 to step 572 wherein Applicants' method, based upon the comparison of step 570, determines if the transfer function of step 566 models the actual data measured, i.e. determines if the calibration curves formed using that transfer function adequately match the actual datapoints $DP_{ACT(i)}$. If Applicants' method determines in step 572 that the transfer function does not model the measured datapoints, then Applicants' method transitions from step 572 to step 574. For example, in certain embodiments Applicants' method determines that the transfer function of step 566 models the measured datapoints if the $RE_{AVG}$ is less than or equal to $RE_{MAX}$.

In step 574 Applicants' method determines if (n) equals $(n)_{MAX}$. If Applicants' method determines in step 574 that $(n)_{MAX}$ has not been reached, then Applicants' method transitions to step 576 wherein (n) is incremented. Thereafter, Applicants' method transitions from step 576 to step 566 wherein a new transfer function is determined using a higher order data regression analysis. In the event no value for $(n)_{MAX}$ is established in step 564, then Applicants' method returns a finding of "YES" in step 574 and transitions to step 578.

In certain embodiments, Applicants' method includes establishing a maximum number (M) of calibration attempts. If Applicants' method determines in step 574 that $(n)_{MAX}$ has been reached or has not been established, then Applicants' method transitions from step 574 to step 578 wherein Applicants' method determines if (M) calibration attempts have been made. If Applicants' method determines in step 578 that the maximum number of calibration attempts have not been made, then Applicants' method transitions from step 578 to step 516 (FIG. 5A).

If Applicants' method determines in step 578 that (M) calibration attempts have already been made, then Applicants' method transitions from step 578 to step 580 wherein an error message is provided. In the event no value for (M) has been established, then Applicants' method returns a finding of "YES" for step 578.

If Applicants' method determines in step 572 that the transfer function of step 566 adequately models the measured datapoints, then Applicants' method transitions to step 582 wherein that transfer function is saved for subsequent use. In certain embodiments, the transfer function is saved in a memory device, such as memory 107 (FIG. 1).

Applicants' method transitions from step 582 to step 584 wherein Applicants' method determines if the one or more sensors require calibration using a different servo pattern. If Applicants' method determines in step 584 that the one or more sensors requires calibration using a different servo pattern, then Applicants' method transitions from step 584 to step 510. Alternatively, if no further calibration is required, then Applicants' method transitions from step 584 to step 590 and ends.

As those skilled in the art will appreciate, the transfer function saved in step 582 is subsequently used to calculate one or more expected position error signals ("PES") for the servo loop at the laterally offset servo index positions with respect to the sensed first set of linear servo edges. These calculated PES signals are used to track follow during, for example, a read operation, a write operation, and erase operation, and the like.

In certain embodiments, one or more individual steps of Applicants' method summarized in FIGS. 5A and 5B may be combined, eliminated, or reordered.

Applicants' method has been described above in embodiments wherein one or more servo sensors are calibrated. Applicants' method, however, is not limited to calibrating servo sensors. Rather, Applicants' method can be used to calibrate transducers in an electrically noisy environment.

Figure 11:
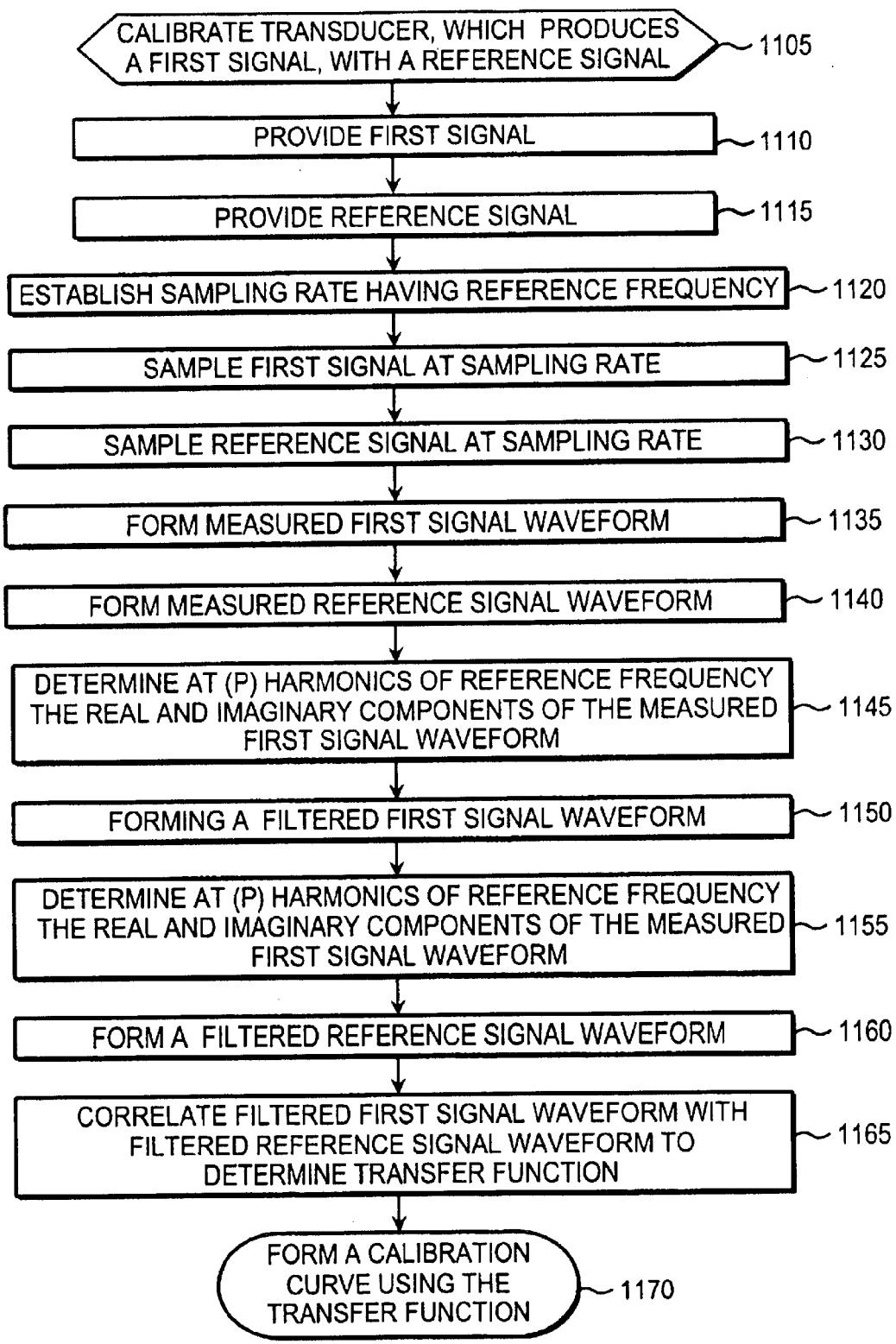
FIG. 11 is a flow chart summarizing the steps of Applicants' method to calibrate a transducer.

Referring to FIG. 11, in step 1105 Applicants' method calibrates a transducer with respect to a reference signal, where that transducer produces a first signal. In step 1110, the transducer provides that first signal. In step 1115, the reference provides the reference signal. In step 1120, Applicants' method establishes a sampling rate at a reference frequency.

In step 1125, Applicants' method samples the first signal at the sampling rate. In step 1130, Applicants' method samples the reference signal at the reference frequency. In step 1135, Applicants' method digitally forms a measured first signal waveform using the data of step 1125. In step 1140, Applicants' method digitally forms a measured reference signal waveform using the data of step 1130.

In step 1145, Applicants' method determines at (P) harmonics of the reference frequency the real and imaginary components of the measured first signal waveform using the embodiments described above with respect to steps 530 (FIG. 5A) and 550 (FIG. 5A). In step 1150, Applicants' method forms a filtered first signal waveform using the embodiments described above with respect to steps 535 (FIG. 5A) and 555 (FIG. 5A).

In step 1155, Applicants' method determines at (P) harmonics of the reference frequency the real and imaginary components of the measured reference signal waveform using the embodiments described above with respect to steps 530 (FIG. 5A) and 550 (FIG. 5A). In step 1160, Applicants' method forms a filtered reference signal waveform using the embodiments described above with respect to steps 535 (FIG. 5A) and 555 (FIG. 5A).

In step 1165, Applicants' method correlates the filtered reference signal waveform of step 1160 with the filtered first signal waveform of step 1150 to form a transfer function using the embodiments described above with respect to steps 560 (FIG. 5B), 562 (FIG. 5B), 564 (FIG. 5B), and 566 (FIG. 5B). In step 1170, Applicants' method forms a calibration curve for the transducer using the transfer function of step 1165. In certain embodiments, one or more individual steps of Applicants' method summarized in FIG. 11 may be combined, eliminated, or reordered.

Applicants' invention further includes an article of manufacture comprising a computer useable medium having computer readable program code disposed therein for calibrating a transducer in an electrically noisy environment. Applicants' invention further includes a computer program product usable with a programmable computer processor having computer readable program code embodied therein for calibrating a transducer in an electrically noisy environment.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the position of said tape head with respect to said tape path, said method comprising the steps of:

moving said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;

providing an IPS signal;

providing a servo signal comprising the ratio of said detected first recorded signal and said detected second recorded signal;

establishing a sampling rate;

sampling said servo signal at said sampling rate;

sampling said IPS signal at said sampling rate;

forming a measured servo signal waveform;

forming a measured IPS signal waveform;

determining the real components and the imaginary components of said measured servo signal waveform;

forming a filtered servo signal waveform;

determining the real components and imaginary components of said measured IPS signal waveform;

forming a filtered IPS signal waveform;

calculating a transfer function comprising the mathematical relationship between said filtered IPS signal waveform and said filtered servo signal waveform; and calculating one or more expected position error signals using said transfer function.

2. The method of claim 1, wherein said determining steps further comprise using a Goertzel algorithm.

3. The method of claim 1, further comprising the steps of:

correlating said filtered IPS signal waveform with said filtered servo signal waveform;

determining a plurality of actual datapoints; and forming an X/Y array comprising said plurality of actual datapoints.

4. The method of claim 3, further comprising the steps of:

determining a plurality of calculated datapoints using said transfer function; and comparing said plurality of actual datapoints with said plurality of calculated datapoints.

5. The method of claim 1, further comprising the steps of:

determining at each of (P) harmonics of said reference frequency the real components and the imaginary components of said measured servo signal waveform, wherein (P) is an integer equal to or greater than 1 and equal to or less than about 6; and determining at each of said (P) harmonics of said reference frequency the real components and the imaginary components of said measured IPS signal waveform.

6. The method of claim 5, wherein said determining steps are performed using a Goertzel filter.

7. The method of claim 5, further comprising the steps of:

calculating the magnitude M(i) of said measured IPS signal waveform at each of said (P) harmonics of said reference frequency;

calculating the phase φ(i) of said measured IPS signal waveform at each of said (P) harmonics of said reference frequency; and forming said filtered IPS signal waveform using the equation $$\sum M_{(i)} * \cos[\phi_{(i)} + (2i)(\pi)(t)/x];$$

wherein (i) is an integer greater than or equal to 1 and less than or equal to (P), and wherein (t)/x is greater than or equal to 0 and less than or equal to 1.

8. The method of claim 7, wherein (P) is 4.

9. The method of claim 5, further comprising the steps of:

calculating the magnitude M(i) of said measured servo signal waveform at each of said (P) harmonics of said reference frequency;

calculating the phase φ(i) of said measured servo signal waveform at each of said (P) harmonics of said reference frequency; and forming said filtered servo signal ratio waveform using the equation $$M_{(0)} + \sum M_{(i)} * \cos[\phi_{(i)} + (2i)(\pi)(t)/x];$$

wherein M(0) comprises the DC component of said measured servo signal waveform, and wherein (i) is an integer greater than or equal to 1 and less than or equal to (P), and wherein (t)/x is greater than or equal to 0 and less than or equal to 1.

10. The method of claim 9, wherein (P) is 4.

11. The method of claim 1, wherein said calculating step further comprises using an (n)th order curve fitting program, wherein (n) is an integer greater than 1 and less than or equal to about 6.

12. The method of claim 11, wherein (n) is 3.

13. A method to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the position of said tape head with respect to said tape path, said method comprising the steps of:

moving said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;

providing an IPS signal;

providing a servo signal comprising the ratio of said detected first recorded signal and said detected second recorded signal;

establishing a sampling rate;

sampling said servo signal at said sampling rate;

sampling said IPS signal at said sampling rate;

forming a measured servo signal waveform;

forming a measured IPS signal waveform;

determining at each of four harmonics of that reference frequency the real and imaginary components of said measured servo signal waveform;

calculating the magnitude M of said measured servo signal waveform at each of said four harmonics of said reference frequency;

calculating the phase φ of said measured servo signal waveform at each of said four harmonics of said reference frequency;

forming a filtered servo signal ratio waveform using the equation $$M_{servo(0)} + \sum M_{servo(i)} * \cos[\phi_{servo(i)} + (2i)(\pi)(t)/x]$$

wherein $M_{servo(0)}$ comprises the DC component of said measured servo signal waveform, and wherein (i) is an integer greater than or equal to 1 and less than or equal to 4, and wherein (t)/x is greater than or equal to 0 and less than or equal to 1;

determining at four harmonics of that reference frequency the real and imaginary components of said measured IPS signal waveform;

calculating the magnitude $M_{IPS}$ of said measured IPS signal waveform at each of the four harmonics of said reference frequency;

calculating the phase $\phi_{IPS}$ of said measured IPS signal waveform at each of the four harmonics of said reference frequency;

forming a filtered IPS signal waveform using the equation $$\sum M_{IPS(i)} * \cos[\phi_{IPS(i)} + (2i)(\pi)(t)/x]$$

wherein (i) is an integer between 1 and 4, and wherein (t)/x is greater than or equal to 0 and less than or equal to 1;

determining a plurality of actual datapoints;

forming an X/Y array comprising said plurality of actual datapoints;

calculating a transfer function using a third order curve fitting algorithm and said X/Y array;

determining a plurality of calculated datapoints using said transfer function;

determining if said transfer function models said actual datapoints; and operative if said transfer function models said actual datapoints, calculating using said transfer function one or more expected position error signals.

14. An article of manufacture comprising a computer useable medium having computer readable program code disposed therein for calibrating a servo sensor disposed on a magnetic tape head disposed adjacent a moving magnetic tape, wherein said magnetic tape includes at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said magnetic tape with respect to said tape head, the computer readable program code comprising a series of computer readable program steps to effect:

moving said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;

providing an IPS signal;

providing a servo signal comprising the ratio of said detected first recorded signal and said detected second recorded signal;

establishing a sampling rate;

sampling said servo signal at said sampling rate;

sampling said IPS signal at said sampling rate;

forming a measured servo signal waveform;

forming a measured IPS signal waveform;

determining at (P) harmonics of said reference frequency the real components and the imaginary components of said measured servo signal waveform;

forming a filtered servo signal waveform;

determining at (P) harmonics of said reference frequency the real components and imaginary components of said measured IPS signal waveform;

forming a filtered IPS signal waveform;

calculating a transfer function comprising the mathematical relationship between said filtered IPS signal waveform and said filtered servo signal waveform; and calculating one or more expected position error signals using said transfer function.

15. The article of manufacture of claim 14, wherein computer readable program code to determine at said reference frequency the real component and the imaginary component of said measured servo signal waveform and said measured IPS waveform further comprises a series of computer readable program steps to effect using a Goertzel algorithm.

16. The article of manufacture of claim 14, wherein the computer readable program code further comprises a series of computer readable program steps to effect:

correlating said filtered IPS signal waveform with said filtered servo signal waveform;

determining a plurality of actual datapoints; and forming an X/Y array comprising said plurality of actual datapoints.

17. The article of manufacture of claim 16, wherein the computer readable program code further comprises a series of computer readable program steps to effect:

determining a plurality of calculated datapoints using said transfer function; and comparing said plurality of actual datapoints with said plurality of calculated datapoints.

18. The article of manufacture of claim 14, wherein said computer readable program code further comprises a series of computer readable program steps to effect:

determining at each of (P) harmonics of said reference frequency the real components and the imaginary components of said measured servo signal waveform, wherein (P) is an integer equal to or greater than 1 and equal to or less than about 6; and determining at each of said (P) harmonics of said reference frequency the real components and the imaginary components of said measured IPS signal waveform.

19. The article of manufacture of claim 18, wherein the computer readable program code to determine at said reference frequency and at each of (P) harmonics of that reference frequency the real components and the imaginary components of said measured servo signal waveform, and to determine at said reference frequency and at each of (P) harmonics of that reference frequency the real components and the imaginary components of said measured IPS waveform, further comprises a series of computer readable program steps to effect using a Goertzel filter.

20. The article of manufacture of claim 18, wherein the computer readable program code to form a filtered IPS signal waveform further comprises a series of computer readable program steps to effect:

calculating the magnitude M(i) of said measured IPS signal waveform at each of said (P) harmonics of said reference frequency;

calculating the phase φ(i) of said measured IPS signal waveform at each of said (P) harmonics of said reference frequency; and forming said filtered IPS signal waveform using the equation $$\sum M_{(i)} * \cos[\phi_{(i)} + (2i)(\pi)(t)/x];$$

wherein (i) is an integer greater than or equal to 1 and less than or equal to (P), and wherein (t)/x is greater than or equal to 0 and less than or equal to 1.

21. The article of manufacture of claim 20, wherein said computer readable program code further comprises a series of computer readable program steps to effect setting (P) to 4.

22. The article of manufacture of claim 18, wherein the computer readable program code to form a filtered servo signal ratio waveform further comprises a series of computer readable program steps to effect:

calculating the magnitude M(i) of said measured servo signal waveform at each of said (P) harmonics of said reference frequency;

calculating the phase φ(i) of said measured servo signal waveform at each of said (P) harmonics of said reference frequency; and forming said filtered servo signal ratio waveform using the equation $$M_{(0)} + \sum M_{(i)} * \cos[\phi_{(i)} + (2i)(\pi)(t)/x];$$

wherein M(0) comprises the DC component of said measured servo signal waveform, and wherein (i) is an integer greater than or equal to 1 and less than or equal to (P), and wherein (t)/x is greater than or equal to 0 and less than or equal to 1.

23. The article of manufacture of claim 22, wherein said computer readable program code further comprises a series of computer readable program steps to effect setting (P) to 4.

24. The article of manufacture of claim 14, wherein the computer readable program code to calculate said transfer function further comprises a series of computer readable program steps to effect using an (n)th order curve fitting program, wherein (n) is an integer greater than 1 and less than or equal to about 6.

25. The article of manufacture of claim 24, wherein said computer readable program code further comprises a series of computer readable program steps to effect setting (n) to 3.

26. An article of manufacture comprising a computer useable medium having computer readable program code disposed therein for calibrating a servo sensor disposed on a magnetic tape head disposed adjacent a moving magnetic tape, wherein said magnetic tape includes at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said magnetic tape with respect to said tape head, the computer readable program code comprising a series of computer readable program steps to effect:

moving said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;

providing an IPS signal;

providing a servo signal comprising the ratio of said detected first recorded signal and said detected second recorded signal;

establishing a sampling rate;

sampling said servo signal at said sampling rate;

sampling said IPS signal at said sampling rate;

forming a measured servo signal waveform;

forming a measured IPS signal waveform;

determining at each of four harmonics of that reference frequency the real and imaginary components of said measured servo signal waveform;

calculating the magnitude M of said measured servo signal waveform at each of said four harmonics of said reference frequency;

calculating the phase φ of said measured servo signal waveform at each of said four harmonics of said reference frequency;

forming a filtered servo signal ratio waveform using the equation $$M_{servo(0)} + \sum M_{servo(i)} * \cos[\phi_{servo(i)} + (2i)(\pi)(t)/x]$$

wherein $M_{servo(0)}$ comprises the DC component of said measured servo signal waveform, and wherein (i) is an integer greater than or equal to 1 and less than or equal to 4, and wherein (t)/x is greater than or equal to 0 and less than or equal to 1;

determining at four harmonics of that reference frequency the real and imaginary components of said measured IPS signal waveform;

calculating the magnitude $M_{IPS}$ of said measured IPS signal waveform at each of the four harmonics of said reference frequency;

calculating the phase $\phi_{IPS}$ of said measured IPS signal waveform at each of the four harmonics of said reference frequency;

forming a filtered IPS signal waveform using the equation $$\sum M_{IPS(i)} * \cos[\phi_{IPS(i)} + (2i)(\pi)(t)/x]$$

wherein (i) is an integer between 1 and 4, and wherein (t)/x is greater than or equal to 0 and less than or equal to 1;

determining a plurality of actual datapoints;

forming an X/Y array comprising said plurality of actual datapoints;

calculating a transfer function using a third order curve fitting algorithm and said X/Y array;

determining a plurality of calculated datapoints using said transfer function;

determining if said transfer function models said actual datapoints; and operative if said transfer function models said actual datapoints, calculating using said transfer function one or more expected position error signals.

27. A computer program product usable with a programmable computer processor having computer readable program code embodied therein to calibrate a servo sensor disposed on a magnetic tape head disposed adjacent a moving magnetic tape, wherein said magnetic tape includes at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said magnetic tape with respect to said tape head, comprising:

computer readable program code which causes said programmable computer processor to move said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;

computer readable program code which causes said programmable computer processor to provide an IPS signal;

computer readable program code which causes said programmable computer processor to provide a servo signal comprising the ratio of said detected first recorded signal and said detected second recorded signal;

computer readable program code which causes said programmable computer processor to provide a sampling rate;

computer readable program code which causes said programmable computer processor to sample said servo signal at said sampling rate;

computer readable program code which causes said programmable computer processor to sample said IPS signal at said sampling rate;

computer readable program code which causes said programmable computer processor to provide a measured servo signal waveform;

computer readable program code which causes said programmable computer processor to provide a measured IPS signal waveform;

computer readable program code which causes said programmable computer processor to determine the real components and the imaginary components of said measured servo signal waveform;

computer readable program code which causes said programmable computer processor to form a filtered servo signal waveform;

computer readable program code which causes said programmable computer processor to determine the real components and imaginary components of said measured IPS signal waveform;

computer readable program code which causes said programmable computer processor to form a filtered IPS signal waveform;

computer readable program code which causes said programmable computer processor to calculate a transfer function comprising the mathematical relationship between said filtered IPS signal waveform and said filtered servo signal waveform; and computer readable program code which causes said programmable computer processor to calculate one or more expected position error signals using said transfer function.

28. The computer program product of claim 27, wherein said computer readable program code which causes said programmable computer processor to determine at said reference frequency the real component and the imaginary component of said measured servo signal waveform and said measured IPS waveform further comprises computer readable program code which causes said programmable computer processor to use a Goertzel algorithm.

29. The computer program product of claim 27, further comprising:

computer readable program code which causes said programmable computer processor to correlate said filtered IPS signal waveform with said filtered servo signal waveform;

computer readable program code which causes said programmable computer processor to determine a plurality of actual datapoints; and computer readable program code which causes said programmable computer processor to form an X/Y array comprising said plurality of actual datapoints.

30. The computer program product of claim 29, further comprising:

computer readable program code which causes said programmable computer processor to determine a plurality of calculated datapoints using said transfer function; and computer readable program code which causes said programmable computer processor to compare said plurality of actual datapoints with said plurality of calculated datapoints.

31. The computer program product of claim 27, further comprising:

computer readable program code which causes said programmable computer processor to determining at each of (P) harmonics of said reference frequency the real components and the imaginary components of said measured servo signal waveform, wherein (P) is an integer equal to or greater than 1 and equal to or less than about 6; and computer readable program code which causes said programmable computer processor to determine at each of said (P) harmonics of said reference frequency the real components and the imaginary components of said measured IPS signal waveform.

32. The computer program product of claim 31, wherein the computer readable program code which causes said programmable computer processor to determine at said reference frequency, and at each of the harmonics of that reference frequency, the real components and the imaginary components of said measured servo signal waveform, and to determine at said reference frequency, and at each of the (P) harmonics of that reference frequency, the real components and the imaginary components of said measured IPS waveform, further comprises computer readable program code which causes said programmable computer processor to use a Goertzel filter.

33. The computer program product of claim 31, wherein the computer readable program code which causes said programmable computer processor to form a filtered IPS signal waveform further comprises:

computer readable program code which causes said programmable computer processor to calculating the magnitude M(i) of said measured IPS signal waveform at each of said (P) harmonics of said reference frequency;

computer readable program code which causes said programmable computer processor to calculate the phase φ(i) of said measured IPS signal waveform at each of said (P) harmonics of said reference frequency; and computer readable program code which causes said programmable computer processor to form said filtered IPS signal waveform using the equation $$\sum M_{(i)} * \cos[\phi_{(i)} + (2i)(\pi)(t)/x];$$

wherein (i) is an integer greater than or equal to 1 and less than or equal to (P), and wherein (t)/x is greater than or equal to 0 and less than or equal to 1.

34. The computer program product of claim 33, further comprising computer readable program code which causes said programmable computer processor to set (P) to 4.

35. The computer program product of claim 31, wherein the computer readable program code which causes said programmable computer processor to form a filtered servo signal ratio waveform further comprises:

computer readable program code which causes said programmable computer processor to calculate the magnitude M(i) of said measured servo signal waveform at each of said (P) harmonics of said reference frequency;

computer readable program code which causes said programmable computer processor to calculate the phase φ(i) of said measured servo signal waveform at each of said (P) harmonics of said reference frequency; and computer readable program code which causes said programmable computer processor to form said filtered servo signal ratio waveform using the equation $$M_{(0)} + \sum M_{(i)} * \cos[\phi_{(i)} + (2i)(\pi)(t)/x];$$

wherein M(0) comprises the DC component of said measured servo signal waveform, and wherein (i) is an integer greater than or equal to 1 and less than or equal to (P), and wherein (t)/x is greater than or equal to 0 and less than or equal to 1.

36. The computer program product of claim 35, further comprising computer readable program code which causes said programmable computer processor to set (P) to 4.

37. The computer program product of claim 27, wherein the computer readable program code which causes said programmable computer processor to calculate said transfer function further comprises computer readable program code which causes said programmable computer processor to use an (n)th order curve fitting program, wherein (n) is an integer greater than 1 and less than or equal to about 6.

38. The computer program product of claim 37, further computer readable program code which causes said programmable computer processor to set (n) to 3.

39. A computer program product usable with a programmable computer processor having computer readable program code embodied therein for to calibrate a servo sensor disposed on a magnetic tape head disposed adjacent a moving magnetic tape, wherein said magnetic tape includes at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said magnetic tape with respect to said tape head, comprising:

computer readable program code which causes said programmable computer processor to move said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;

computer readable program code which causes said programmable computer processor to provide an IPS signal;

computer readable program code which causes said programmable computer processor to provide a servo signal comprising the ratio of said detected first recorded signal and said detected second recorded signal;

computer readable program code which causes said programmable computer processor to provide a sampling rate;

computer readable program code which causes said programmable computer processor to sample said servo signal at said sampling rate;

computer readable program code which causes said programmable computer processor to sample said IPS signal at said sampling rate;

computer readable program code which causes said programmable computer processor to form a measured servo signal waveform;

computer readable program code which causes said programmable computer processor to form a measured IPS signal waveform;

computer readable program code which causes said programmable computer processor to determine at each of four harmonics of that reference frequency the real and imaginary components of said measured servo signal waveform;

computer readable program code which causes said programmable computer processor to calculate the magnitude $M_{servo}$ of said measured servo signal waveform at each of said four harmonics of said reference frequency;

computer readable program code which causes said programmable computer processor to calculate the phase $\phi_{servo}$ of said measured servo signal waveform at each of said four harmonics of said reference frequency;

computer readable program code which causes said programmable computer processor to form a filtered servo signal ratio waveform using the equation $$M_{servo(0)} + \sum M_{servo(i)} * \cos[\phi_{servo(i)} + (2i)(\pi)(t)/x]$$

wherein $M_{servo(0)}$ comprises the DC component of said measured servo signal waveform, and wherein (i) is an integer greater than or equal to 1 and less than or equal to 4, and wherein (t)/x is greater than or equal to 0 and less than or equal to 1;

computer readable program code which causes said programmable computer processor to determine at four harmonics of that reference frequency the real and imaginary components of said measured IPS signal waveform;

computer readable program code which causes said programmable computer processor to calculate the magnitude $M_{IPS}$ of said measured IPS signal waveform at each of the four harmonics of said reference frequency;

computer readable program code which causes said programmable computer processor to calculate the phase $\phi_{IPS}$ of said measured IPS signal waveform at each of the four harmonics of said reference frequency;

computer readable program code which causes said programmable computer processor to form a filtered IPS signal waveform using the equation $$\sum M_{IPS(i)} * \cos[\phi_{IPS(i)} + (2i)(\pi)(t)/x]$$

wherein (i) is an integer between 1 and 4, and wherein (t)/x is greater than or equal to 0 and less than or equal to 1;

computer readable program code which causes said programmable computer processor to determine a plurality of actual datapoints;

computer readable program code which causes said programmable computer processor to form an X/Y array using said plurality of actual datapoints;

computer readable program code which causes said programmable computer processor to calculate a transfer function using a third order curve fitting algorithm and said X/Y array;

computer readable program code which causes said programmable computer processor to determine a plurality of calculated datapoints using said transfer function;

computer readable program code which causes said programmable computer processor to compare said plurality of actual datapoints to said plurality of calculated datapoints;

computer readable program code which causes said programmable computer processor to determine if said transfer function models said actual datapoints; and computer readable program code which, if said transfer function models said actual datapoints, causes said programmable computer processor to calculate using said transfer function one or more expected position error signals.

40. A servo system to calibrate one or more index positions for a magnetic tape, wherein said magnetic tape comprises at least one or more continuous servo edges comprising an interface between a first recorded signal and a second recorded signal, comprising:

a tape head capable of moving alternatively in a first direction and an opposing second direction along a first axis as said magnetic tape moves alternatively in a third direction and an opposing fourth direction along a second axis, wherein said first axis and said second axis are substantially orthogonal, one or more servo sensors disposed on said tape head, wherein said one or more servo sensors are capable of detecting said first recorded signal and said second recorded signal;

a servo detector, wherein said servo detector is capable of communication with each of said one or more servo sensors, and wherein said servo detector provides a servo signal comprising the ratio of the detected first recorded signal and the detected second recorded signal;

an independent position sensor, wherein said independent position sensor provides an IPS signal comprising a measurement of the position of said tape head with respect to said tape path;

a servo loop, wherein said servo loop is capable of moving said tape head in said first direction and in said second direction;

logic, wherein said logic is capable of communicating with said servo detector, said independent position sensor, and said servo loop, said logic:

moving said tape head alternatively in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;

receiving an IPS signal;

receiving a servo signal;

establishing a sampling rate;

sampling said servo signal at said sampling rate;

sampling said IPS signal at said sampling rate;

forming a measured servo signal waveform;

forming a measured IPS signal waveform;

determining the real components and the imaginary components of said measured servo signal waveform;

forming a filtered servo signal waveform;

determining the real components and imaginary components of said measured IPS signal waveform;

forming a filtered IPS signal waveform;

calculating a transfer function comprising the mathematical relationship between said filtered IPS signal waveform and said filtered servo signal waveform; and calculating one or more expected position error signals using said transfer function.

41. The servo system of claim 40, further comprising a Goertzel filter, wherein said logic comprises a Goertzel algorithm.

42. The servo system of claim 40, said logic:

correlating said filtered IPS signal waveform with said filtered servo signal waveform;

determining a plurality of actual datapoints; and forming an X/Y array comprising said plurality of actual datapoints.

43. The servo system of claim 42, said logic:

determining a plurality of calculated datapoints using said transfer function; and comparing said plurality of actual datapoints with said plurality of calculated datapoints.

44. The servo system of claim 40, said logic:

determining at each of (P) harmonics of said reference frequency the real components and the imaginary components of said measured servo signal waveform, wherein (P) is an integer equal to or greater than 1 and equal to or less than about 6; and determining at each of said (P) harmonics of said reference frequency the real components and the imaginary components of said measured IPS signal waveform.

45. The servo system of claim 44, said logic performing said determining steps using a Goertzel filter.

46. The servo system of claim 45, further comprising a digital signal processor, wherein said Goertzel filter is implemented in an application specific chip disposed in said digital signal processor.

47. The servo system of claim 44, said logic:

calculating the magnitude M(i) of said measured IPS signal waveform at each of said (P) harmonics of said reference frequency;

calculating the phase $\phi(i)$ of said measured IPS signal waveform at each of said (P) harmonics of said reference frequency; and forming said filtered IPS signal waveform using the equation $$\sum M_{(i)} * \cos[\phi_{(i)} + (2i)(\pi)(t)/x];$$

wherein (i) is an integer greater than or equal to 1 and less than or equal to (P), and wherein (t)/x is greater than or equal to 0 and less than or equal to 1.

48. The servo system of claim 47, said logic setting (P) to 4.

49. The servo system of claim 44, said logic:
calculating the magnitude M(i) of said measured servo signal waveform at each of said (P) harmonics of said reference frequency;
calculating the phase φ(i) of said measured servo signal waveform at each of said (P) harmonics of said reference frequency; and
forming said filtered servo signal ratio waveform using the equation $$M_{(0)} + \sum M_{(i)} * \cos[\phi_{(i)} + (2i)(\pi)(t)/x];$$

wherein M(0) comprises the DC component of said measured servo signal waveform, and wherein (i) is an integer greater than or equal to 1 and less than or equal to (P), and wherein (t)/x is greater than or equal to 0 and less than or equal to 1.

50. The servo system of claim 49, said logic setting (P) to 4.

51. The servo system of claim 40, said logic using an (n)th order curve fitting program, wherein (n) is an integer greater than 1 and less than or equal to about 6.

52. The servo system of claim 51, said logic setting (n) to 3.

53. A servo system to calibrate one or more index positions for a magnetic tape, wherein said magnetic tape comprises at least one or more continuous servo edges comprising an interface between a first recorded signal and a second recorded signal, comprising:
a tape head capable of moving alternatingly in a first direction and an opposing second direction along a first axis as said magnetic tape moves alternatingly in a third direction and an opposing fourth direction along a tape path, wherein said first axis and said tape path are substantially orthogonal,
one or more servo sensors disposed on said tape head, wherein each of said one or more servo sensors are capable of detecting said first recorded signal and said second recorded signal;
a servo detector, wherein said servo detector is capable of communication with each of said one or more servo sensors, and wherein said servo detector provides a servo signal comprising the ratio of the detected first recorded signal and the detected second recorded signal;
an independent position sensor, wherein said independent position sensor provides an IPS signal comprising a measurement of the position of said tape head with respect to said tape path;
a servo loop, wherein said servo loop is capable of moving said tape head in said first direction and in said second direction;
logic, wherein said logic is capable of communicating with said servo detector, said independent position sensor, and said servo loop, said logic:
moving said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;
receiving an IPS signal;
receiving a servo signal comprising the ratio of said detected first recorded signal and said detected second recorded signal;
establishing a sampling rate;
sampling said servo signal at said sampling rate;
sampling said IPS signal at said sampling rate;
forming a measured servo signal waveform;
forming a measured IPS signal waveform;
determining at each of four harmonics of that reference frequency the real and imaginary components of said measured servo signal waveform;
calculating the magnitude $M_{servo}$ of said measured servo signal waveform at each of said four harmonics of said reference frequency;
calculating the phase $\phi_{servo}$ of said measured servo signal waveform at each of said four harmonics of said reference frequency;
forming a filtered servo signal ratio waveform using the equation $$M_{servo(0)} + \sum M_{servo(i)} * \cos[\phi_{servo(i)} + (2i)(\pi)(t)/x]$$

wherein $M_{servo(0)}$ comprises the DC component of said measured servo signal waveform, and wherein (i) is an integer greater than or equal to 1 and less than or equal to 4, and wherein (t)/x is greater than or equal to 0 and less than or equal to 1;
determining at four harmonics of that reference frequency the real and imaginary components of said measured IPS signal waveform;
calculating the magnitude $M_{IPS}$ of said measured IPS signal waveform at each of the four harmonics of said reference frequency;
calculating the phase $\phi_{IPS}$ of said measured IPS signal waveform at each of the four harmonics of said reference frequency;
forming a filtered IPS signal waveform using the equation $$\sum M_{IPS(i)} * \cos[\phi_{IPS(i)} + (2i)(\pi)(t)/x]$$

wherein (i) is an integer between 1 and 4, and wherein (t)/x is greater than or equal to 0 and less than or equal to 1;
correlating said form a first calibration curve;
determining a plurality of actual datapoints;
forming an X/Y array using said plurality of actual datapoints;
calculating a transfer function using a third order curve fitting algorithm and said X/Y array;
determining a plurality of calculated datapoints using said transfer function;
determining a plurality of calculated datapoints using said transfer function;
determining if said transfer function models said actual datapoints; and operative if said transfer function models said actual datapoints, calculating using said transfer function one or more expected position error signals.

54. A tape drive for reading and/or writing information to a magnetic tape, wherein said magnetic tape comprises at least one or more continuous servo edges comprising an interface between a first recorded signal and a second recorded signal, comprising:
  a motion system capable of moving said magnetic tape alternatingly in a first direction and an opposing second direction along a tape path;
  a tape head capable of moving alternatingly in a third direction and an opposing fourth direction along a second axis, wherein said tape path and said second axis are substantially orthogonal,
  one or more servo sensors disposed on said tape head, wherein each of said one or more servo sensors are capable of detecting said first recorded signal and said second recorded signal;
  a servo detector, wherein said servo detector is capable of communication with each of said one or more servo sensors, and wherein said servo detector provides a servo signal comprising the ratio of the detected first recorded signal and the detected second recorded signal;
  an independent position sensor, wherein said independent position sensor provides an IPS signal comprising a measurement of the lateral position of said magnetic tape with respect to said tape head;
  a servo loop, wherein said servo loop is capable of moving said tape head in said third direction and in said fourth direction;
  logic, wherein said logic is capable of communicating with said servo detector, said independent position sensor, and said servo loop, said logic:
  moving said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;
  receiving an IPS signal;
  receiving a servo signal comprising the ratio of said detected first recorded signal and said detected second recorded signal;
  establishing a sampling rate;
  sampling said servo signal at said sampling rate;
  sampling said IPS signal at said sampling rate;
  forming a measured servo signal waveform;
  forming a measured IPS signal waveform;
  determining at (P) harmonics of said reference frequency the real components and the imaginary components of said measured servo signal waveform;
  forming a filtered servo signal waveform;
  determining at (P) harmonics of said reference frequency the real components and imaginary components of said measured IPS signal waveform;
  forming a filtered IPS signal waveform;
  calculating a transfer function comprising the mathematical relationship between said filtered IPS signal waveform and said filtered servo signal waveform; and
  calculating one or more expected position error signals using said transfer function.

55. The tape drive of claim 54, further comprising a Goertzel filter, wherein said logic comprises a Goertzel algorithm.

56. The tape drive of claim 54, said logic:
  correlating said filtered IPS signal waveform with said filtered servo signal waveform;
  determining a plurality of actual datapoints; and
  forming an X/Y array comprising said plurality of actual datapoints.

57. The tape drive of claim 56, said logic:
  determining a plurality of calculated datapoints using said transfer function; and
  comparing said plurality of actual datapoints with said plurality of calculated datapoints.

58. The tape drive of claim 54, said logic:
  determining at each of (P) harmonics of said reference frequency the real components and the imaginary components of said measured servo signal waveform, wherein (P) is an integer equal to or greater than 1 and equal to or less than about 6; and
  determining at each of said (P) harmonics of said reference frequency the real components and the imaginary components of said measured IPS signal waveform.

59. The tape drive of claim 58, said logic performing said determining steps using a Goertzel filter.

60. The tape drive of claim 59, further comprising a digital signal processor, wherein said Goertzel algorithm is implemented in an application specific chip disposed in said digital signal processor.

61. The tape drive of claim 58, said logic:
  calculating the magnitude M(i) of said measured IPS signal waveform at each of said (P) harmonics of said reference frequency;
  calculating the phase $\phi(i)$ of said measured IPS signal waveform at each of said (P) harmonics of said reference frequency; and
  forming said filtered IPS signal waveform using the equation $$\sum M_{(i)} * \cos[\phi_{(i)} + (2i)(\pi)(t)/x];$$

wherein (i) is an integer greater than or equal to 1 and less than or equal to (P), and wherein (t)/x is greater than or equal to 0 and less than or equal to 1.

62. The tape drive of claim 61, said logic setting (P) to 4.

63. The tape drive system of claim 58, said logic:
  calculating the magnitude M(i) of said measured servo signal waveform at each of said (P) harmonics of said reference frequency;
  calculating the phase $\phi(i)$ of said measured servo signal waveform at each of said (P) harmonics of said reference frequency; and
  forming said filtered servo signal ratio waveform using the equation $$M_{(0)} + \sum M_{(i)} * \cos[\phi_{(i)} + (2i)(\pi)(t)/x];$$

wherein M(0) comprises the DC component of said measured servo signal waveform, and wherein (i) is an integer greater than or equal to 0 and less than or equal to (P), and wherein (t)/x is greater than or equal to 0 and less than or equal to 1.

64. The tape drive of claim 63, said logic setting (P) to 4.

65. The tape drive of claim 54, said logic using an (n)th order curve fitting program, wherein (n) is greater than 1 and less than or equal to about 6.

66. The tape drive of claim 65, said logic setting (n) to 3.

67. A tape drive for reading and/or writing information to a magnetic tape, wherein said magnetic tape comprises at least one or more continuous servo edges comprising an interface between a first recorded signal and a second recorded signal, comprising:

- a motion system capable of moving said magnetic tape alternatingly in a first direction and an opposing second direction along a tape path;
- a tape head capable of moving alternatingly in a third direction and an opposing fourth direction along a second axis, wherein said tape path and said second axis are substantially orthogonal,
- one or more servo sensors disposed on said tape head, wherein each of said one or more servo sensors is capable of detecting said first recorded signal and said second recorded signal;
- a servo detector, wherein said servo detector is capable of communication with each of said one or more servo sensors and wherein said servo detector provides a servo signal comprising the ratio of the detected first recorded signal and the detected second recorded signal;
- an independent position sensor, wherein said independent position sensor provides an IPS signal comprising a measurement of the position of said tape head with respect to said tape path;
- a servo loop, wherein said servo loop is capable of moving said tape head in said third direction and in said fourth direction;
- logic, wherein said logic is capable of communicating with said servo detector, said independent position sensor, and said servo loop, said logic:
- moving said tape head alternatingly in a first direction and an opposing second direction along a first axis as said tape moves along a second axis, wherein said first axis and said second axis are substantially orthogonal, wherein the position of said magnetic head along said first axis as a function of time comprises a periodic function having a reference frequency;
- receiving an IPS signal;
- receiving a servo signal comprising the ratio of said detected first recorded signal and said detected second recorded signal;
- establishing a sampling rate;
- sampling said servo signal at said sampling rate;
- sampling said IPS signal at said sampling rate;
- forming a measured servo signal waveform;
- forming a measured IPS signal waveform;
- determining at each of four harmonics of that reference frequency the real and imaginary components of said measured servo signal waveform;
- calculating the magnitude $M_{servo}$ of said measured servo signal waveform at each of said four harmonics of said reference frequency;
- calculating the phase $\phi_{servo}$ of said measured servo signal waveform at each of said four harmonics of said reference frequency;
- forming a filtered servo signal ratio waveform using the equation $$M_{servo(0)} + \sum M_{servo(i)} * \cos[\phi_{servo(i)} + (2i)(\pi)(t)/x]$$

wherein $M_{servo(0)}$ comprises the DC component of said measured servo signal waveform, and wherein (i) is an integer greater than or equal to 1 and less than or equal to 4, and wherein (t)/x is greater than or equal to 0 and less than or equal to 1;

- determining at four harmonics of that reference frequency the real and imaginary components of said measured IPS signal waveform;
- calculating the magnitude $M_{IPS}$ of said measured IPS signal waveform at each of the four harmonics of said reference frequency;
- calculating the phase $\phi_{IPS}$ of said measured IPS signal waveform at each of the four harmonics of said reference frequency;
- forming a filtered IPS signal waveform using the equation $$\sum M_{IPS(i)} * \cos[\phi_{IPS(i)} + (2i)(\pi)(t)/x]$$

wherein (i) is an integer between 1 and 4, and wherein (t)/x is greater than or equal to 0 and less than or equal to 1;

- correlating said form a first calibration curve;
- determining a plurality of actual datapoints;
- forming an X/Y array using said plurality of actual datapoints;
- calculating a transfer function using a third order curve fitting algorithm and said X/Y array;
- determining a plurality of calculated datapoints using said transfer function;
- determining a plurality of calculated datapoints using said transfer function;
- determining if said transfer function models said actual datapoints; and
- operative if said transfer function models said actual datapoints, calculating using said transfer function one or more expected position error signals.

68. A method to calibrate a transducer, wherein said transducer provides a first signal, and wherein a reference provides a reference signal, said method comprising the steps of:

- providing said first signal;
- providing said reference signal;
- establishing a sampling rate comprising a reference frequency;
- sampling said first signal at said sampling rate;
- sampling said reference signal at said sampling rate;
- forming a measured first signal waveform;
- forming a measured reference signal waveform;
- determining at (P) harmonics of said reference frequency the real components and the imaginary components of said measured first signal waveform;
- forming a filtered first signal waveform;
- determining at (P) harmonics of said reference frequency the real components and imaginary components of said measured reference signal waveform;
- forming a filtered reference signal waveform;

calculating a transfer function comprising the mathematical relationship between said filtered reference signal waveform and said filtered first signal waveform; and forming a calibration curve using said transfer function.

69. The method of claim 68, wherein said determining steps further comprise using a Goertzel algorithm.

70. The method of claim 69, further comprising the steps of:

correlating said filtered reference signal waveform with said filtered first signal waveform;

determining a plurality of actual datapoints; and forming an X/Y array comprising said plurality of actual datapoints.

71. The method of claim 70, further comprising the steps of:

determining a plurality of calculated datapoints using said transfer function; and comparing said plurality of actual datapoints with said plurality of calculated datapoints.

72. The method of claim 68, further comprising the steps of:

determining at each of (P) harmonics of said reference frequency the real components and the imaginary components of said measured first signal waveform, wherein (P) is an integer equal to or greater than 1 and equal to or less than about 6; and determining at each of said (P) harmonics of said reference frequency the real components and the imaginary components of said measured reference signal waveform.

73. The method of claim 72, wherein said determining steps are performed using a Goertzel filter.

74. The method of claim 72, further comprising the steps of:

calculating the magnitude M(i) of said measured reference signal waveform at each of said (P) harmonics of said reference frequency;

calculating the phase $\phi(i)$ of said measured reference signal waveform at each of said (P) harmonics of said reference frequency; and forming said filtered reference signal waveform using the equation $$\sum M_{(i)} * \cos[\phi_{(i)} + (2i)(\pi)(t)/x];$$

wherein (i) is an integer greater than or equal to 1 and less than or equal to (P), and wherein (t)/x is greater than or equal to 0 and less than or equal to 1.

75. The method of claim 74, wherein (P) is 4.

76. The method of claim 72, further comprising the steps of:

calculating the magnitude M(i) of said measured first signal waveform at each of said (P) harmonics of said reference frequency;

calculating the phase $\phi(i)$ of said measured first signal waveform at each of said (P) harmonics of said reference frequency; and forming said filtered first signal waveform using the equation $$\sum M_{(i)} * \cos[\phi_{(i)} + (2i)(\pi)(t)/x];$$

wherein (i) is an integer greater than or equal to 0 and less than or equal to (P), and wherein (t)/x is greater than or equal to 0 and less than or equal to 1.

77. The method of claim 76, wherein (P) is 4.

78. The method of claim 68, wherein said calculating step further comprises using an (n)th order curve fitting program, wherein (n) is an integer greater than 1 and less than or equal to about 6.

79. The method of claim 78, wherein (n) is 3.

80. A method to calibrate a transducer, wherein said transducer provides a first signal, and wherein a reference provides a reference signal, said method comprising the steps of:

providing said first signal;

providing said reference signal;

establishing a sampling rate comprising a reference frequency;

sampling said first signal at said sampling rate;

sampling said reference signal at said sampling rate;

forming a measured first signal waveform;

forming a measured reference signal waveform;

determining at four harmonics of said reference frequency the real components and the imaginary components of said measured first signal waveform using a Goertzel algorithm;

calculating the magnitude $M_{first}(i)$ of said measured first signal waveform at each of said four harmonics of said reference frequency;

calculating the phase $\phi_{first}(i)$ of said measured first signal waveform at each of said four harmonics of said reference frequency; and forming a filtered first signal waveform using the equation $$\sum M_{first(i)} * \cos[\phi_{first(i)} + (2i)(\pi)(t)/x];$$

wherein (i) is an integer greater than or equal to 0 and less than or equal to (P), wherein $M_{first(0)}$ and $\cos[\phi_{first(0)}+(2i)(\pi)(t)/x]$ represent a DC component, and wherein (t)/x is greater than or equal to 0 and less than or equal to 1;

determining at four harmonics of said reference frequency the real components and imaginary components of said measured reference signal waveform using a Goertzel algorithm;

calculating the magnitude $M_{ref}(i)$ of said measured reference signal waveform at each of said four harmonics of said reference frequency;

calculating the phase $\phi_{ref}(i)$ of said measured reference signal waveform at each of said 4 harmonics of said reference frequency;

forming a filtered reference signal waveform using the equation $$\sum M_{ref(i)} * \cos[\phi_{ref(i)} + (2i)(\pi)(t)/x];$$

wherein (i) is an integer greater than or equal to 1 and less than or equal to (P), and wherein (t)/x is greater than or equal to 0 and less than or equal to 1;

determining a plurality of actual datapoints;

forming an X/Y array comprising said plurality of actual datapoints;

using a third order curve fitting program to form a transfer function using said X/Y array;

determining a plurality of calculated datapoints using said transfer function;

comparing said plurality of actual datapoints with said plurality of calculated datapoints;

forming a calibration curve using said transfer function.

81. A computer program product usable with a programmable computer processor having computer readable program code embodied therein to calibrate a transducer, wherein said transducer provides a first signal, and wherein a reference provides a reference signal, comprising:

computer readable program code which causes said programmable computer processor to provide said first signal;

computer readable program code which causes said programmable computer processor to provide said reference signal;

computer readable program code which causes said programmable computer processor to provide a sampling rate comprising a reference frequency;

computer readable program code which causes said programmable computer processor to sample said first signal at said sampling rate;

computer readable program code which causes said programmable computer processor to sample said reference signal at said sampling rate;

computer readable program code which causes said programmable computer processor to provide a measured first signal waveform;

computer readable program code which causes said programmable computer processor to provide a measured reference signal waveform;

computer readable program code which causes said programmable computer processor to determine at (P) harmonics of said reference frequency the real components and the imaginary components of said measured first signal waveform;

computer readable program code which causes said programmable computer processor to form a filtered first signal waveform;

computer readable program code which causes said programmable computer processor to determine at (P) harmonics of said reference frequency the real components and imaginary components of said measured reference signal waveform;

computer readable program code which causes said programmable computer processor to form a filtered reference signal waveform;

computer readable program code which causes said programmable computer processor to calculate a transfer function comprising the mathematical relationship between said filtered reference signal waveform and said filtered first signal waveform; and computer readable program code which causes said programmable computer processor to form a calibration curve using said transfer function.

82. The computer program product of claim 81, further comprising computer readable program code which causes said programmable computer processor to use a Goertzel algorithm.

83. The computer program product of claim 81, further comprising:

computer readable program code which causes said programmable computer processor to correlating said filtered reference signal waveform with said filtered first signal waveform;

computer readable program code which causes said programmable computer processor to determining a plurality of actual datapoints; and computer readable program code which causes said programmable computer processor to forming an X/Y array comprising said plurality of actual datapoints.

84. The computer program product of claim 83, further comprising:

computer readable program code which causes said programmable computer processor to determining a plurality of calculated datapoints using said transfer function; and computer readable program code which causes said programmable computer processor to comparing said plurality of actual datapoints with said plurality of calculated datapoints.

85. The computer program product of claim 81, further comprising:

computer readable program code which causes said programmable computer processor to determining at each of (P) harmonics of said reference frequency the real components and the imaginary components of said measured first signal waveform, wherein (P) is an integer equal to or greater than 1 and equal to or less than about 6; and computer readable program code which causes said programmable computer processor to determining at each of said (P) harmonics of said reference frequency the real components and the imaginary components of said measured IPS signal waveform.

86. The computer program product of claim 85, further comprising computer readable program code which causes said programmable computer processor use a Goertzel filter.

87. The computer program product of claim 85, further comprising:

computer readable program code which causes said programmable computer processor to calculating the magnitude M(i) of said measured reference signal waveform at each of said (P) harmonics of said reference frequency;

computer readable program code which causes said programmable computer processor to calculating the phase φ(i) of said measured reference signal waveform at each of said (P) harmonics of said reference frequency; and computer readable program code which causes said programmable computer processor to forming said filtered reference signal waveform using the equation $$\sum M_{(i)} * \cos[\phi_{(i)} + (2i)(\pi)(t)/x];$$

wherein (i) is an integer greater than or equal to 1 and less than or equal to (P), and wherein (t)/x is greater than or equal to 0 and less than or equal to 1.

88. The computer program product of claim 87, further comprising computer readable program code which causes said programmable computer processor to set (P) to 4.

89. The computer program product of claim 85, further comprising:

computer readable program code which causes said programmable computer processor to calculating the magnitude M(i) of said measured first signal waveform at each of said (P) harmonics of said reference frequency;

computer readable program code which causes said programmable computer processor to calculating the phase φ(i) of said measured first signal waveform at each of said (P) harmonics of said reference frequency; and computer readable program code which causes said programmable computer processor to forming said filtered first signal waveform using the equation $$\sum M_{(i)} * \cos[\phi_{(i)} + (2i)(\pi)(t)/x];$$

wherein (i) is an integer greater than or equal to 0 and less than or equal to (P), and wherein (t)/x is greater than or equal to 0 and less than or equal to 1.

90. The computer program product of claim 89, further comprising computer readable program code which causes said programmable computer processor to set (P) to 4.

91. The computer program product of claim 81, further comprising computer readable program code which causes said programmable computer processor to use an (n)th order curve fitting program, wherein (n) is an integer greater than 1 and less than or equal to about 6.

92. The computer program product of claim 91, further comprising computer readable program code which causes said programmable computer processor to set (n) to 3.

93. A computer program product usable with a programmable computer processor having computer readable program code embodied therein to calibrate a transducer, wherein said transducer provides a first signal, and wherein a reference provides a reference signal, comprising:

computer readable program code which causes said programmable computer processor to providing said first signal;

computer readable program code which causes said programmable computer processor to providing said reference signal;

computer readable program code which causes said programmable computer processor to establishing a sampling rate comprising a reference frequency;

computer readable program code which causes said programmable computer processor to sampling said first signal at said sampling rate;

computer readable program code which causes said programmable computer processor to sampling said reference signal at said sampling rate;

computer readable program code which causes said programmable computer processor to forming a measured first signal waveform;

computer readable program code which causes said programmable computer processor to forming a measured reference signal waveform;

computer readable program code which causes said programmable computer processor to determining at four harmonics of said reference frequency the real components and the imaginary components of said measured first signal waveform using a Goertzel algorithm;

computer readable program code which causes said programmable computer processor to calculating the magnitude $M_{first}(i)$ of said measured first signal waveform at each of said four harmonics of said reference frequency;

computer readable program code which causes said programmable computer processor to calculating the phase $\phi_{first}(i)$ of said measured first signal waveform at each of said four harmonics of said reference frequency; and computer readable program code which causes said programmable computer processor to forming a filtered first signal waveform using the equation $$\sum M_{first(i)} * \cos[\phi_{first(i)} + (2i)(\pi)(t)/x];$$

wherein (i) is an integer greater than or equal to 0 and less than or equal to (P), and wherein (t)/x is greater than or equal to 0 and less than or equal to 1;

computer readable program code which causes said programmable computer processor to determining at four harmonics of said reference frequency the real components and imaginary components of said measured reference signal waveform using a Goertzel algorithm;

computer readable program code which causes said programmable computer processor to calculating the magnitude $M_{ref}(i)$ of said measured reference signal waveform at each of said four harmonics of said reference frequency;

computer readable program code which causes said programmable computer processor to calculating the phase $\phi_{ref}(i)$ of said measured reference signal waveform at each of said 4 harmonics of said reference frequency;

computer readable program code which causes said programmable computer processor to forming a filtered reference signal waveform using the equation $$\sum M_{ref(i)} * \cos[\phi_{ref(i)} + (2i)(\pi)(t)/x];$$

wherein (i) is an integer greater than or equal to 1 and less than or equal to (P), and wherein (t)/x is greater than or equal to 0 and less than or equal to 1;

computer readable program code which causes said programmable computer processor to determining a plurality of actual datapoints;

computer readable program code which causes said programmable computer processor to forming an X/Y array comprising said plurality of actual datapoints;

computer readable program code which causes said programmable computer processor to using a third order curve fitting program to form a transfer function using said X/Y array;

computer readable program code which causes said programmable computer processor to determining a plurality of calculated datapoints using said transfer function;

computer readable program code which causes said programmable computer processor to comparing said plurality of actual datapoints with said plurality of calculated datapoints;

computer readable program code which causes said programmable computer processor to forming a calibration curve using said transfer function.

* * * * *